US008542397B2

(12) United States Patent
Yamaguchi et al.

(10) Patent No.: US 8,542,397 B2
(45) Date of Patent: Sep. 24, 2013

(54) IMAGE DISPLAY CONTROL DEVICE AND IMAGE FORMING APPARATUS INCLUDING THE SAME

(75) Inventors: Takeshi Yamaguchi, Osaka (JP); Masato Shiozaki, Osaka (JP); Hirotaka Kodama, Osaka (JP); Kazuyuki Ogida, Osaka (JP); Atsuhiko Murakami, Osaka (JP); Takayuki Kawasato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 121 days.

(21) Appl. No.: 13/099,440

(22) Filed: May 3, 2011

(65) Prior Publication Data

US 2011/0279392 A1 Nov. 17, 2011

(30) Foreign Application Priority Data

May 11, 2010 (JP) ................................ 2010-109395

(51) Int. Cl.
*G06K 15/00* (2006.01)

(52) U.S. Cl.
USPC ........................................................ 358/1.18

(58) Field of Classification Search
USPC .......... 345/173–184, 684, 682, 688; 358/1.9, 358/1.12–1.15, 1.18, 501, 504, 527, 537, 358/538, 401, 406, 449, 452, 453; 715/243–253, 273, 274, 277
See application file for complete search history.

(56) References Cited

U.S. PATENT DOCUMENTS

| | | | | |
|---|---|---|---|---|
| 6,473,539 | B1 * | 10/2002 | Koga | 382/317 |
| 8,203,722 | B2 * | 6/2012 | Yano et al. | 358/1.12 |
| 2006/0224559 | A1 | 10/2006 | Abiko | |
| 2007/0139741 | A1 * | 6/2007 | Takami et al. | 358/527 |
| 2007/0157084 | A1 * | 7/2007 | Yano et al. | 715/527 |
| 2007/0216973 | A1 * | 9/2007 | Tagawa | 358/527 |
| 2008/0225346 | A1 * | 9/2008 | Mano et al. | 358/448 |
| 2008/0309956 | A1 * | 12/2008 | Yano et al. | 358/1.9 |
| 2011/0235109 | A1 * | 9/2011 | Yamaguchi | 358/1.15 |

FOREIGN PATENT DOCUMENTS

| | | | |
|---|---|---|---|
| JP | 03-048865 | | 3/1991 |
| JP | 2004-282439 | | 10/2004 |
| JP | 2005-218789 | * | 7/2005 |
| JP | 2006-272904 | | 10/2006 |
| JP | 2007-36809 | * | 2/2007 |
| JP | 2008-070835 | | 3/2008 |
| JP | 2008-311956 | | 12/2008 |
| JP | 2010-056904 | | 3/2010 |

* cited by examiner

*Primary Examiner* — Dennis Joseph
*Assistant Examiner* — Chun-Nan Lin
(74) *Attorney, Agent, or Firm* — Renner, Otto, Boisselle & Sklar, LLP

(57) ABSTRACT

To provide a control unit including a touch panel display capable of presenting preview display of multiple pages of document images on the display panel, the touch panel display includes: a binding position indicating controller; a binding process preview displaying controller that displays preview images of recording paper bound at the specified position; a paper binding position-linked scrolling display switching controller that, when the binding position in the printed paper is modified, switches the direction of scrolling preview display so as to be suited to the recording paper bound at the modified binding position.

2 Claims, 18 Drawing Sheets

1321
132
Binding Position : Left
One Sided → One Sided
135
S
1
2
3
Color
1in1
A4→A4 100%

1321
132
Binding Position: Left
Binding Position: Right
Binding Position: Top
Binding Position: Right Top
Binding Position: Left Top
Binding Position: Center
Non-binding
One Sided → One Sided
135
Color
1in1
A4→A4 100%

1321
Binding Position : Center
One Sided → Dual Sided
135
132
Color
1in1
A4→A4 71%

IMAGE DISPLAY CONTROL DEVICE AND IMAGE FORMING APPARATUS INCLUDING THE SAME

This Nonprovisional application claims priority under 35 U.S.C. §119(a) on Patent Application No. 2010-109395 filed in Japan on 11 May 2010, the entire contents of which are hereby incorporated by reference.

BACKGROUND OF THE INVENTION (1) Field of the Invention

The present invention relates to an image display control device for use in an electrophotographic image forming apparatus such a copier, printer, facsimile machine or the like and an image forming apparatus including the control device, in particular, relating to an image display control device capable of displaying plural pages of document images in a preview representation as well as to an image forming apparatus including the same.

(2) Description of the Prior Art

Conventionally, there have been recording systems which include a post-processing apparatus that performs stapling and/or other processes on recorded matter output from an image forming apparatus so as to produce individual complete recorded matter after image forming and processing.

In such a recording system, it is usual that the user selects the position of stapling on the recording paper to be the recorded matter in advance.

However, by just performing key selection on the control panel in order to perform staple finishing, it is impossible to grasp how and where the recording paper as the recorded matter will be stapled. As a result, there occur some cases in which printed paper is stapled at wrong positions and hence just go to waste, being unable to provide expected recorded matter.

To deal with this, as the prior art there has been a proposal of a system in which some lamps (indicating means) that show the state of the recording paper with printed images being stapled are provided near the document set position so that if the user selects the desired position of stapling on the recording paper through a control unit, the lamps inform the user that stapling operation will be implemented on the recording paper with images recorded (see Patent document 1).

However, in the above method it is unknown how the actual output of recorded matter is stapled, hence there is the problem that it is difficult for the user to understand whether the paper that is stapled at the positions the user wanted will be output. That is, there still remains the problem of the copying operation being done faultily.

As a measure against this, a technique has been recently proposed in which the state of the finished paper is displayed in advance by a preview display function provided for an image display control device that permits the user to select and control on the control screen mounted on an image forming apparatus or the like (see Patent Document 2).

Patent Document 1:

Japanese Patent Application Laid-open H03-48865

Patent Document 2:

Japanese Patent Application Laid-open 2008-70835

However, according to the above-described prior art, though it is possible to check the finished condition, there is still problem that it is difficult for the user to visually grasp the relationship between the state of the images formed on recording paper and the finished position of each recorded material with images formed. There is also the problem that the demand that the user wants to check every page of the finished paper in a feeling as if the user is turning over the page of the actual printed matter is not supported.

SUMMARY OF THE INVENTION

The present invention has been devised in view of the above prior art problems, it is therefore an object of the present invention to provide an image display control device, as well as to an image forming apparatus including the control device, which can provide an environment in which, when print preview images are displayed, the direction of scrolling preview images can be switched in conformity with the setting of the binding position, and when the binding position is changed, the user can confirm the finished condition of the actually recorded matter through the preview display in a feeling as if the user is turning over the pages of the printed matter, hence the user is able to easily imagine the condition of the finish of the recorded matter.

The first aspect of the invention resides in an image display control device comprising: a control screen on which document images are presented in preview representation; and, a display controller that has a function of presenting plural pages of document images on the control screen in preview representation and a function of displaying the plural pages of document images presented in preview representation in a vertically or horizontally scrolling manner, characterized in that the display controller includes: a binding position indicating function that, when recording paper with the document images recorded thereon are bound, indicates a binding position in the recording paper; a binding process preview displaying function that displays preview images of the recording paper bound at the binding position indicated by the binding position indicating function; and, a scrolling display switching function that, when the binding position in the recording paper is modified by the binding position indicating function, switches the scrolling display mode of the preview images of the recording paper such that the direction of scrolling is suited to the recording paper bound at the modified binding position.

The second aspect of the invention is characterized in that the scrolling display switching function switches the direction of scrolling the preview images displayed on the control screen, between the display mode in which the preview images are scrolled from the left to the right in the control screen and the display mode in which the preview images are scrolled from the right to the left in the control screen.

The third aspect of the invention is characterized in that the scrolling display switching function switches the direction of scrolling the preview images displayed on the control screen, between the display mode in which the preview images are scrolled in the horizontal direction of the control screen and the display mode in which the preview images are scrolled in the vertical direction of the control screen.

The fourth aspect of the invention is characterized in that when the binding position for the recording paper is modified, the preview displaying function displays the modified binding position in the recording paper selected as the recording paper to which the document images are recorded while the preview images of the document images are displayed at a size corresponding to the size of the selected recording paper.

The fifth aspect of the invention is characterized in that when the binding position of the recording paper is set in the center (so-called saddle-stitch position) where the recording paper is halved into left and right parts, the preview displaying function displays the preview images of document images by reducing the document images and allotting the reduced images to both the left and right sides of the binding position of the recording paper. For example, it is preferable that the preview images are displayed left and right in the horizontal spread and that the preview images are displayed at top and bottom in the vertical spread.

The sixth aspect of the invention is characterized in that the display controller includes a magnification displaying function for notifying that display of the preview images is reduced in size compared to the document images. For example, a comment etc. may be displayed on the control screen so as to provide a notice.

According to the seventh aspect of the invention, an image forming apparatus including an image display control device is characterized in that the image display control device is the image display control device having one of the above first to sixth aspects.

According to the first aspect of the present invention, it is possible to change the direction of scrolling the preview images in accordance with the setting of the binding position when the print preview images are displayed. Further, the preview display enables the user to confirm the finished condition of the recorded matter to be actually produced, in a feeling as if the user is actually turning over the pages of the recorded matter. As a result, the user is able to view the relationship of the position of each image-formed page in the finished recorded matter and confirm the finished condition of the recorded matter every page in a feeling as if the user is turning over the page. As a result, the user is able to easily imagine the condition of the finished recorded matter and reduce faulty printing.

According to the second aspect of the present invention, the user is able to easily confirm the condition of the finished recorded matter due to the suitable scrolling direction of preview images.

According to the third aspect of the present invention, the user is able to easily confirm the condition of the finished recorded matter due to the suitable scrolling direction of preview images.

According to the fourth aspect of the present invention, the user is able to easily confirm the condition of the finished recorded matter.

According to the fifth aspect of the present invention, when the binding position of the recording paper is set in the center where the recording paper is halved into left and right parts, the preview images are displayed in the horizontal spread by reducing document images and allotting the reduced images on both the left and right of the binding position of the recording paper. In a case of vertical spreads, the preview images are displayed at top and bottom. As a result, this preview displaying function enables the user to easily confirm the finished condition of the recorded matter.

According to the sixth aspect of the present invention, it is possible for the user to easily recognize that the preview images are reduced in size.

According to the seventh aspect of the present invention, it is possible to change the direction of scrolling the preview images in accordance with the setting of the binding position when the print preview images are displayed. Further, the preview display enables the user to confirm the finished condition of the recorded matter to be actually produced, in a feeling as if the user actually turns over the pages of the recorded matter. As a result, the user is able to view the relationship of the position of each image-formed page in the finished recorded matter and confirm the finished condition of the recorded matter every page in a feeling as if the user is turning over the page. As a result, it is possible to provide an image forming apparatus that enables the user to easily imagine the condition of the finished recorded matter and reduce faulty printing.

DESCRIPTION OF THE PREFERRED EMBODIMENTS

The embodiments of the present invention will hereinafter be described with reference to the accompanying drawings.

Figure 1:
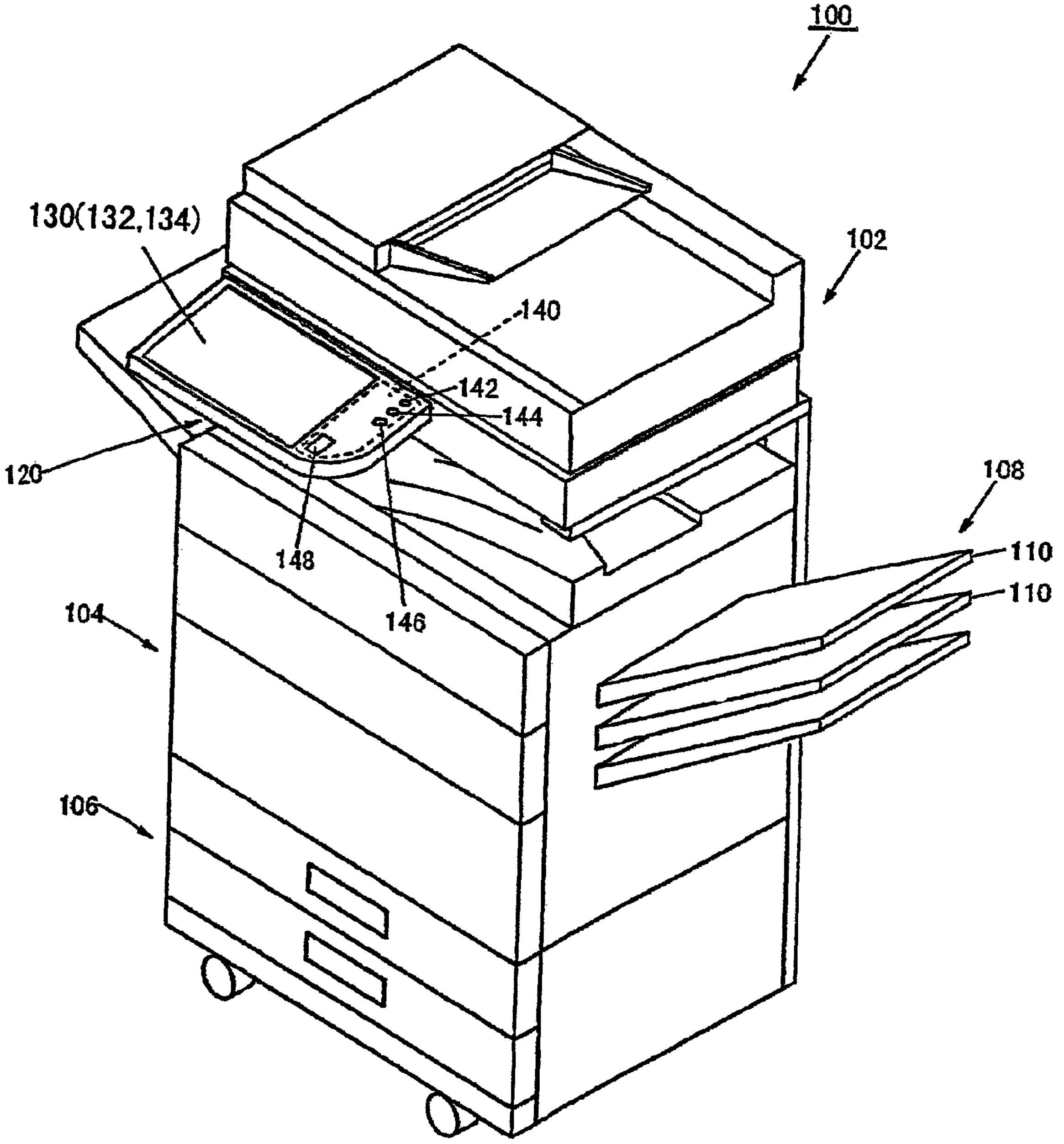
FIG. 1 is a perspective view showing the configuration of an image forming apparatus according to the embodiment of the present invention.
Figure 2:
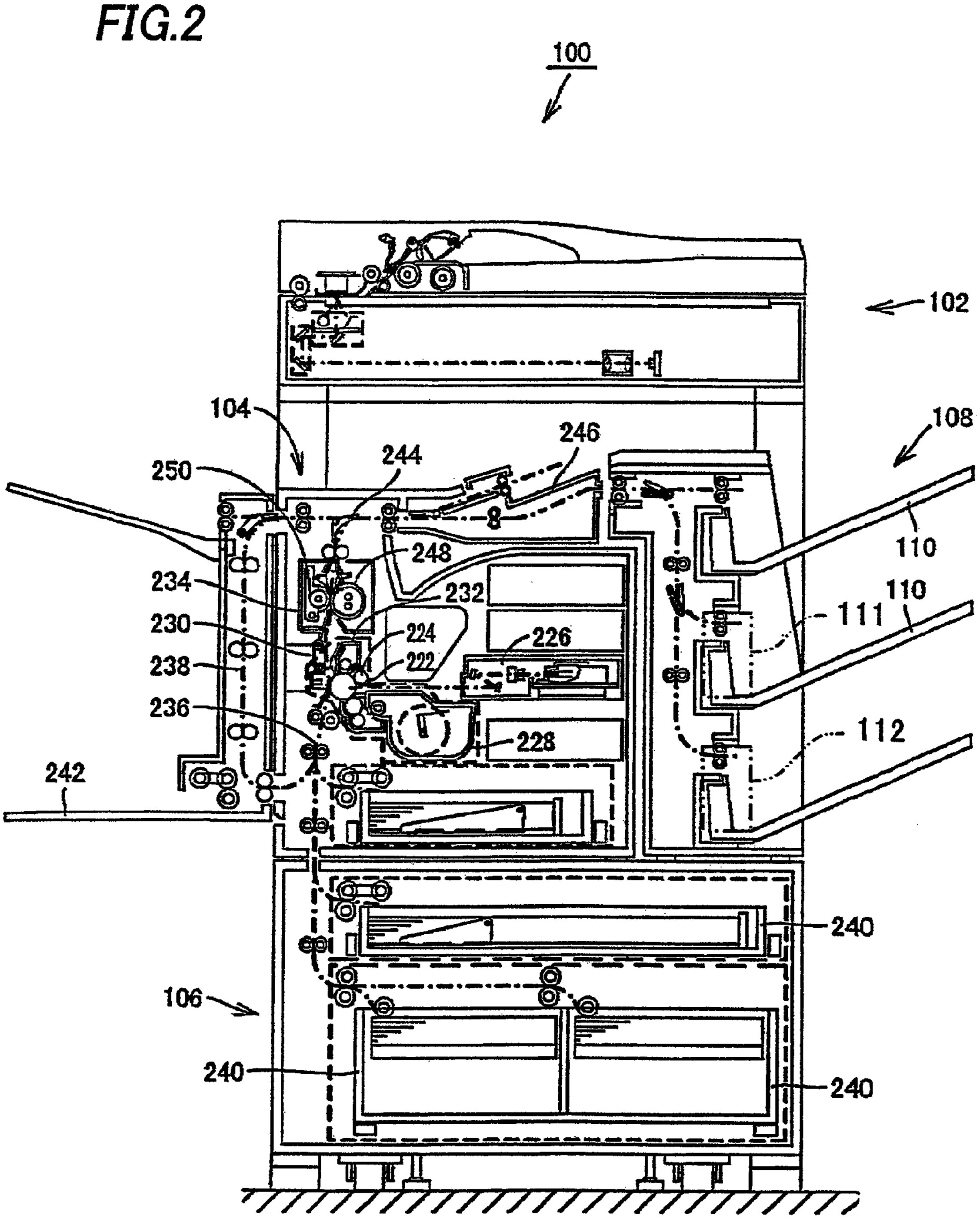
FIG. 2 is an illustrative view schematically showing the internal mechanisms of the image forming apparatus.
Figure 3:
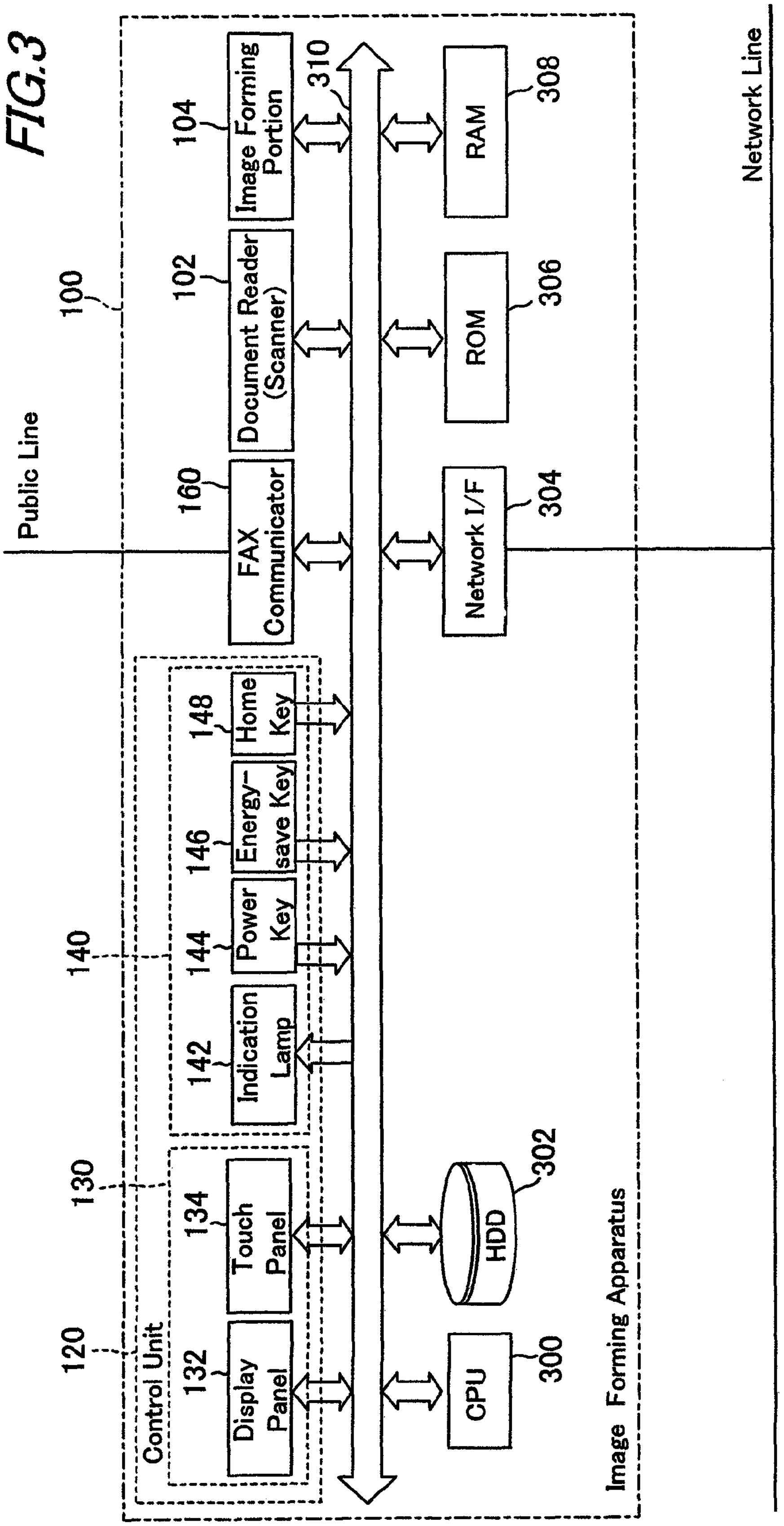
FIG. 3 is a functional block diagram showing a hardware configuration of the image forming apparatus.
Figure 4:
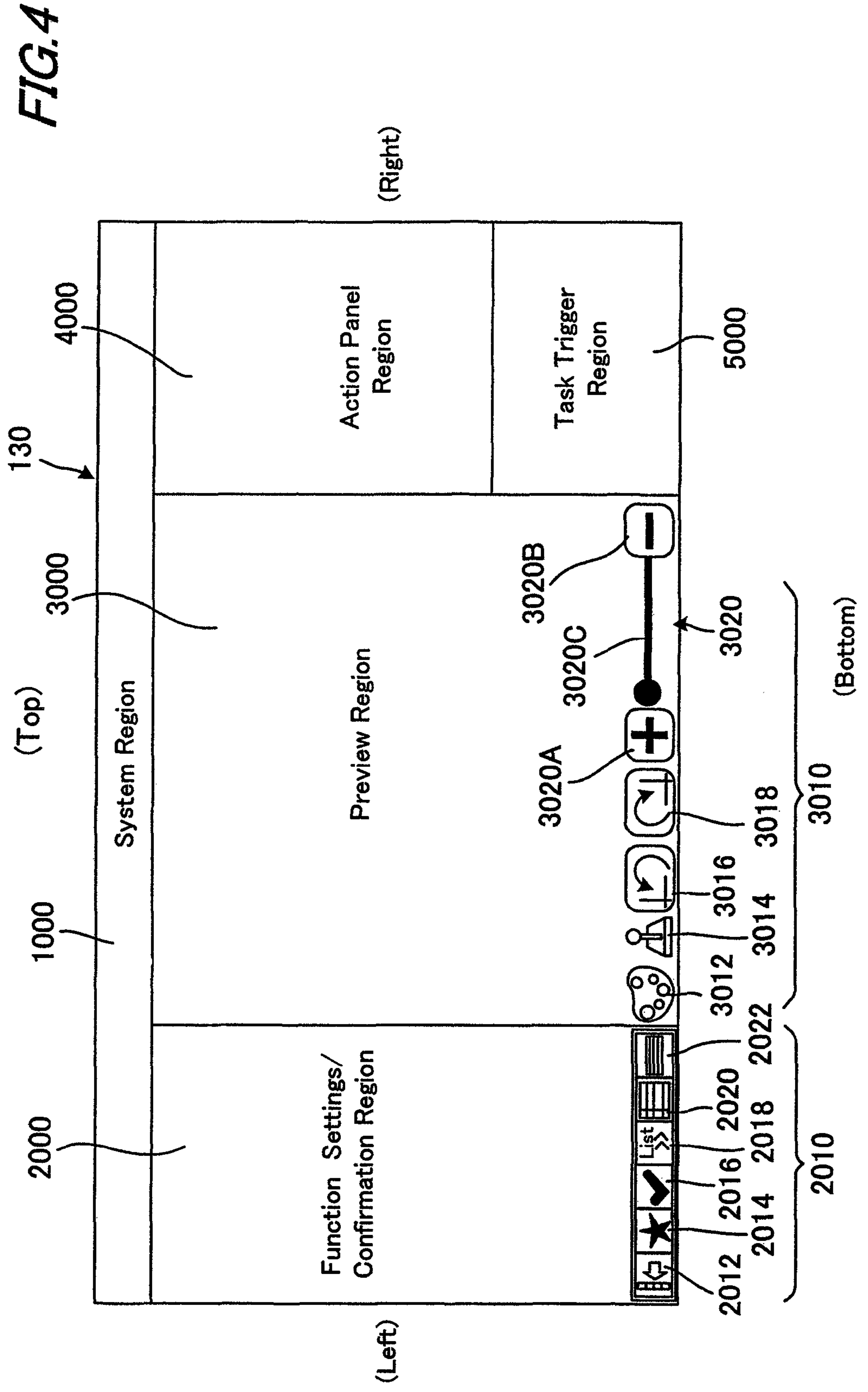
FIG. 4 is an illustrative view showing the display regions of a touch panel display of the image forming apparatus.
Figure 5:
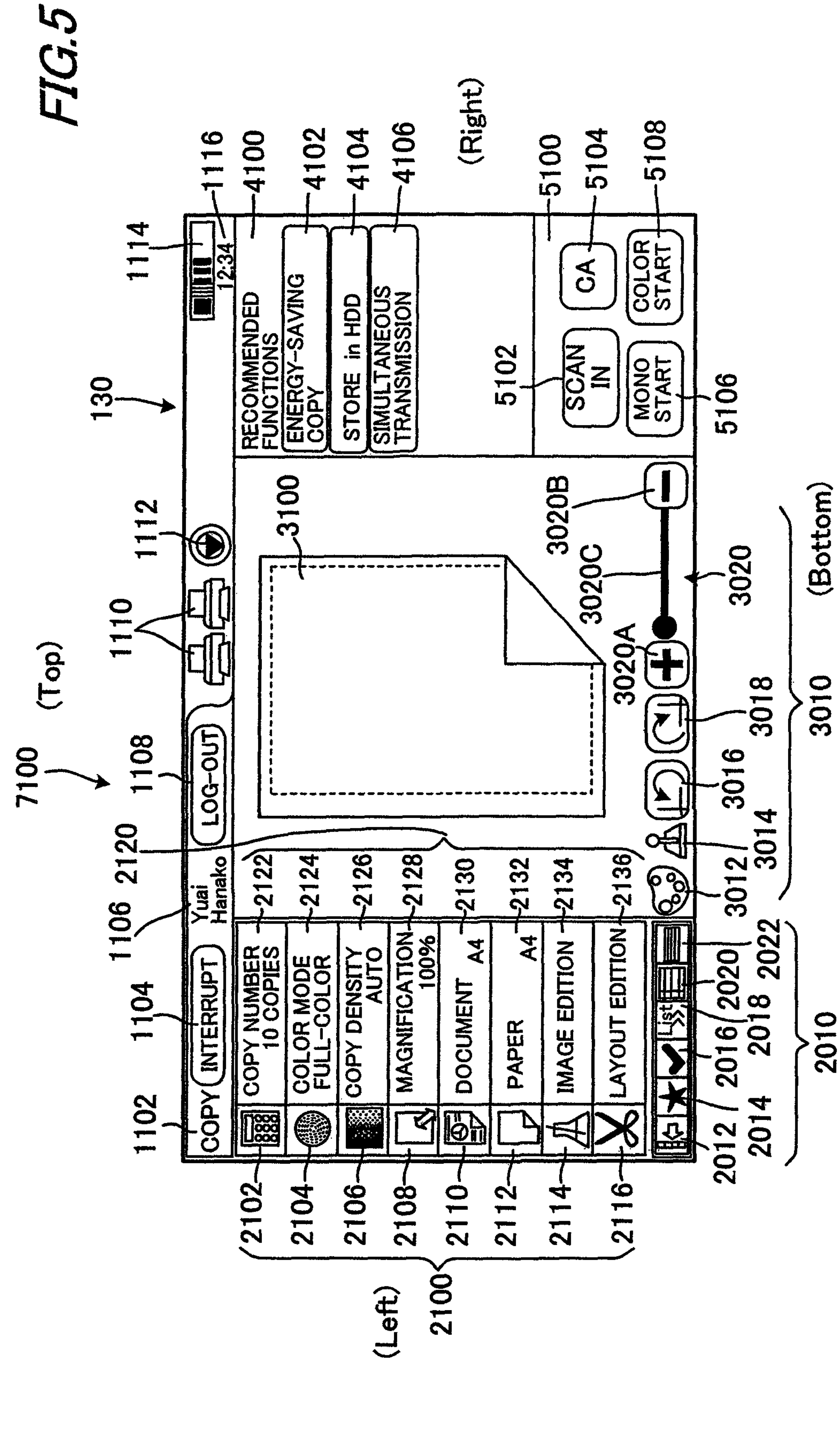
FIG. 5 is an illustrative view showing an example of a screen displayed on the touch panel display.
Figure 6:
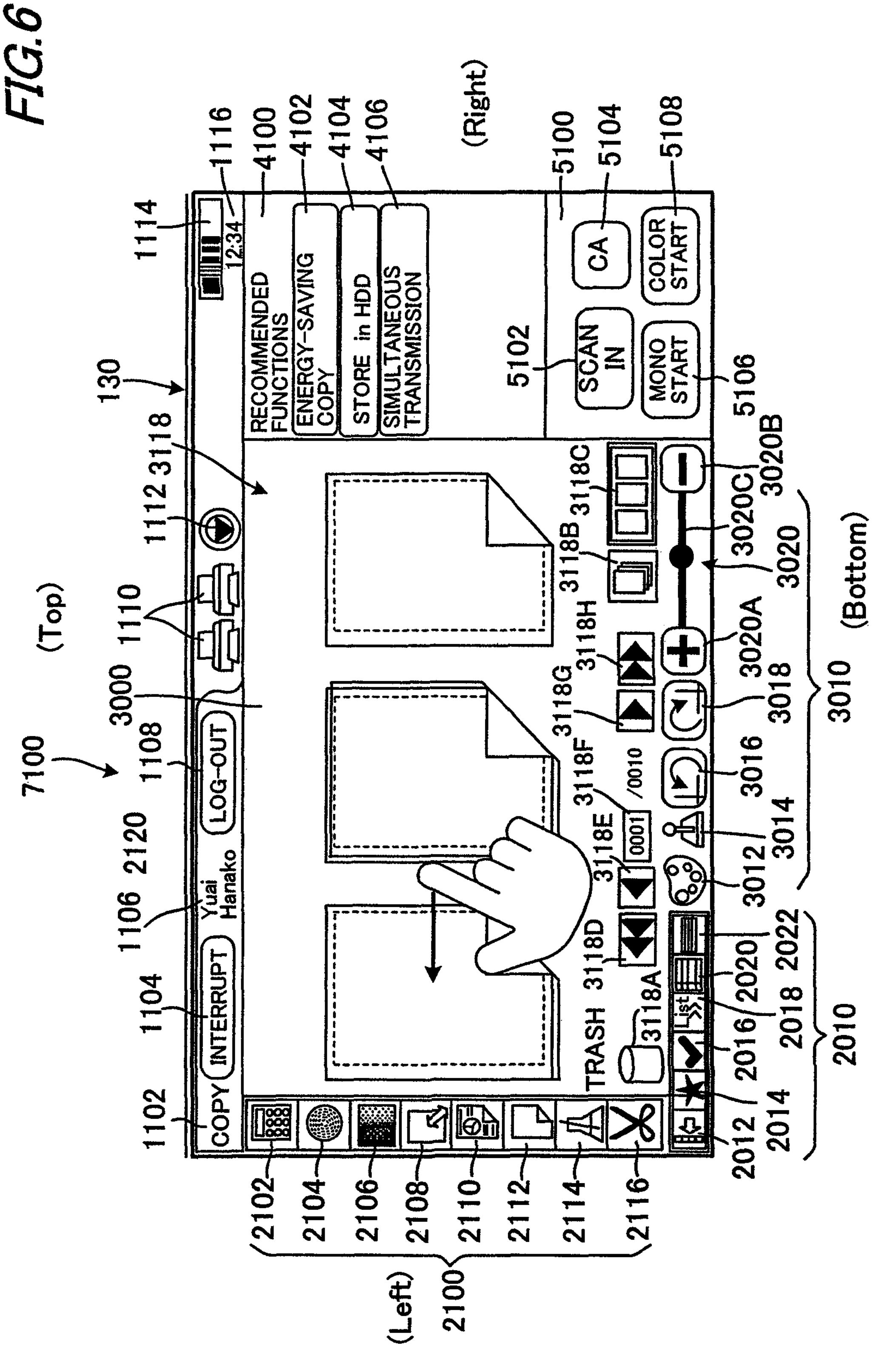
FIG. 6 is an illustrative view showing a state where the preview region being displayed on the touch panel display is varied.

FIG. 1 shows one example of the mode for carrying out the invention and is an illustrative view showing the whole configuration of an image forming apparatus including an image display control device according to the embodiment of the present invention. FIG. 2 is an illustrative view schematically showing the internal mechanisms of the image forming apparatus. FIG. 3 is a functional block diagram showing a hardware configuration of the image forming apparatus. FIG. 4 is an illustrative view showing the display regions on a touch panel display of the image forming apparatus. FIG. 5 is an illustrative view showing an example of a screen displayed on the touch panel display. FIG. 6 is an illustrative view showing a state where the preview region being displayed on the touch panel display is varied.

An image forming apparatus 100 according to the embodiment of the present invention includes, as shown in FIG. 1, a control unit (image display control device) 120 having a touch panel display (display controller) 130 capable of making preview representation of multiple pages of document images on a display panel (control screen) 132.

Description herein will be given on the assumption that the multiple document images displayed on display panel (control screen) 132 are those captured by the document reader of image forming apparatus 100, but the multiple document images may be images to be formed on recording paper by the image forming portion. The recording paper may be any recording medium such as paper, OHP sheet, etc., as long as it can be formable with images.

Image forming apparatus 100 of the present embodiment is a kind of an image processing apparatus. The image display control device according to the present invention is also applicable to image processing apparatuses and electronic appliances other than the image forming apparatuses of this kind.

Further, image forming apparatus 100 includes a plurality of operational modes, and is equipped with a display device for displaying information for each operational mode. The display device is preferably constructed so as to be able to display information the user wants in a user friendly manner even if the user does not remember the screen configuration when the operational mode is changed over.

Here, image forming apparatus 100 includes a touch panel display (control screen) that can be controlled by both gesture control and touch control other than gesture control, but the image forming apparatus may use a touch panel display that can be controlled by touch control only. Alternatively, the image forming apparatus may include a display panel that cannot be touch-controlled but can display only, with keys for control.

Here, gesture control means controls that are related to various kinds of movements of fingers in combination with GUI (Graphic User Interface), such as responses in accordance with the distance moved and speed of the fingers, double-tapping, the moving fingers trace and the like that are given with meanings.

This image forming apparatus 100 forms images on recording paper based on electrophotography.

Image forming apparatus 100 includes, as its operation modes, copy mode, facsimile mode (FAX mode), document filing mode (a mode in which scanned images are stored in a storage inside the image forming apparatus) and mail mode (a mode in which scanned images are transmitted in the form of an attachment file to an e-mail). This image forming apparatus 100 may further have a network printer mode.

The image forming apparatus 100 changes the display content on the screen every time the operation mode is switched. Further, the printing mechanism is not limited to electrophotography.

To begin with, image forming apparatus 100 will be described.

Image forming apparatus 100 includes a document reader 102, an image forming portion 104, a paper feed portion 106, a paper output processor 108 and a control unit 120.

Control unit 120 is formed of a touch panel display 130 and a display control portion 140.

Touch panel display 130 is comprised of a display panel 132 of a liquid crystal panel or the like and a touch panel (touch control detecting means) 134 that is laid over display panel 132 to detect the positions the user presses with fingers.

Display control portion 140 includes an indication lamp 142, a power key 144, an energy-save key 146 and a home key 148 that resets the display content of touch panel display 130 to the home screen for operational mode selection.

In this way, image forming apparatus 100 has touch panel display 130 as a main control device and also has a display control portion 140 that includes the hardware keys and indication lamps.

The keys (power key 144, energy-save key 146 and home key 148) on display control portion 140 are given as hardware buttons, in contrast to software buttons formed by touch panel display 130.

Note that image forming apparatus 100 should not be limited to that including display control portion 140 of this kind, but may be provided with touch panel display 130 only. That is, it will work as long as the initial screen of the selected operational mode can be actuated when the user selects an operational mode on the home screen displayed on touch panel display 130. Next, the operational modes of this image forming apparatus 100 will be described.

(Copy Mode)

The operation of the copy mode of image forming apparatus 100 will be described.

In this copy mode, image reader (which will be referred to hereinbelow as "scanner") 102 and image forming portion 104 operate mainly.

A document placed on a document placement table is read as image data by scanner 102 and the read image data is input to a CPU 300 of a microcomputer etc. shown in FIG. 3, where the image data undergoes various kinds of image processing, and the processed image data is output to image forming portion 104.

As shown in FIG. 2, image forming portion 104 is a mechanism that prints images of documents given as image data onto recording mediums (recording paper in most cases), including a photoreceptor drum 222, a charging device 224, a laser scan unit (which will be referred to hereinbelow as "LSU") 226, a developing device 228, a transfer device 230, a cleaning unit 232, a fixing unit 234, an unillustrated charge eraser and other devices.

Also, image forming portion 104 is provided with a main feed path 236 and a reverse feed path 238. The recording paper fed from paper feed portion 106 is conveyed along main feed path 236. Paper feed portion 106 draws recording paper, one sheet at a time, from a stack of recording paper, held in a paper feed cassette 240 or set on a manual feed tray 242 and delivers the recoding paper to main feed path 236 of image forming portion 104.

In the course of the recording paper being conveyed along main feed path 236 of image forming portion 104, the recording paper passes through and between photoreceptor drum 222 and transfer device 230 and then passes through fixing device 234 to perform printing for the recording paper.

While photoreceptor drum 222 rotates in one direction, its surface is cleaned by cleaning device 232 and the charge erasing device, then uniformly electrified by charging device 224.

LSU 226 modulates the laser beam based on the image data to be printed and repeatedly scans the laser beam over the photoreceptor drum 222 surface in the main scan direction, to form an electrostatic latent image on the photoreceptor drum 222 surface.

Developing unit 228 supplies toner to the photoreceptor drum 222 surface and develops the electrostatic latent image to form a toner image on the photoreceptor drum 222 surface.

Transfer device 230 transfers the toner image on the photoreceptor drum 222 surface to the recording paper which passes through the nip between the transfer device 230 and photoreceptor drum 222.

Fixing device 234 includes a heat roller 248 for heating recording paper and a pressing roller 250 for pressing recording paper. The recording paper is heated by heat roller 248 and pressed by pressing roller 250 so that the toner image transferred to the recording paper is fixed to the recording paper. A heater in the heat roller is heated by the power supplied to this fixing unit 234 so as to control and keep heat roller 248 at a temperature suitable for fixing. When the apparatus enters the energy saving mode, for instance the power supplied to this heater is stopped or cut down.

Arranged at the junction between main feed path 236 and reverse feed path 238 is a branch claw 244. When printing is performed on one side of recording paper only, branch claw 244 is positioned so as to lead the recording paper from fixing device 234 toward a paper output tray 246 or paper output processor 108.

When printing is performed on both sides of recording paper, branch claw 244 is rotated in the predetermined direction so that the recording paper is once conveyed toward the paper output tray 246 side. Then, the paper is switched back and conveyed toward reverse feed path 238. The recording paper then passes through reverse feed path 238 and is inverted upside down and fed to main feed path 236 again. The recording paper is once again printed on its rear side in the course of main feed path 236 and lead to paper output tray 246 or paper output processor 108.

The recording paper thus printed is lead to paper output tray 246 or paper output processor 108 and discharged to either paper output tray 246 or each of paper output trays 110 of paper output processor 108.

In paper output processor 108, a plurality of recording sheets are sorted and discharged to individual paper output trays 110, and/or each set of recording sheets is punched or stapled. For example, when multiple copies of printed documents are prepared, the printed recording sheets are sorted and discharged to paper output trays 110 so that one copy of the printed documents is allotted to individual paper output tray 110, and the printed documents on each paper output tray 110 are punched by a punching unit 111 or stapled by a stapling unit 112 to prepare individual printed matter.

(Facsimile Mode)

Next, the operation in facsimile mode will be described.

In this facsimile mode, the transmitting operation is mainly effected by document reader (scanner) 102 and a FAX communicator 160, as shown in FIG. 3. The receiving operation is mainly effected by FAX communicator 160 and image forming portion 104.

(Transmitting Operation)

The transmitting operation is performed by the steps of: selecting the facsimile mode, reading image data from a document placed on the document placement table by means of document reader 102, supplying the read image data to CPU 300 made up of a microcomputer etc. shown in FIG. 3 where the image data is subjected to various kinds of image processes, and outputting the thus obtained image data to the FAX communicator (FAX communicator 160 in FIG. 3).

As shown in FIG. 3, FAX communicator 160 of the transmission side image forming apparatus 100 connects the selected transmitter side line to the designated destination, converts the image data into communication data conforming to the facsimile communication standard and transmits the communication data to the receiver side facsimile machine (e.g., image forming apparatus 100 having a facsimile function).

(Communication Operation)

When connection of the line is established, FAX communicator 160 of image forming apparatus 100 on the receiver side detects a communication request signal from FAX communicator 160 of image forming apparatus 100 on the transmitter side and sends a response signal. Then, for example, FAX communicators 160 on both the transmitter and receiver sides exchange facsimile performance information of their own with each other and determine the communication rate and coding and code correction scheme of the image data within the available maximum capacity to set up a modem communication scheme. The data is transmitted based on the determined communication scheme, from FAX communicator 160 of image forming apparatus 100 on the transmitter side to FAX communicator 160 of image forming apparatus 100 on the receiver side. When data transmission is ended, the line is cut off.

(Receiving Operation)

The FAX communicator 160 of image forming apparatus 100 on the receiver side converts the received data into image data and sends the data to image forming portion 104. Here, the received data may be converted into image data by image forming portion 104. Image forming portion 104 prints images of documents represented by the image data converted from the received data, onto recording paper, in the same manner as the above-described operation in copy mode.

Next, the control block configuration of image forming apparatus 100 will be described with reference to the drawings.

As shown in FIG. 3, image forming apparatus 100 includes: control unit 120 that allows the user to set copy mode and facsimile mode; a ROM 306 for storing programs etc.; a hard disk 302 serving as a non-volatile storage area that can hold programs, data and the like even if the power is cut off; and a RAM (Random Access Memory) 308 that offers a storing area when a program is executed.

Image forming apparatus 100 further includes: a bus 310 connected to image reader 102, image forming portion 104, FAX communicator 160, control unit 120, ROM 306, hard disk 302 and RAM 308; and CPU 300 that is connected to bus 310 to realize general functions as an image forming apparatus.

Hard disk 302 records (stores) files of image data of documents scanned by the image forming apparatus 100. Hard disk 302 also stores initial screen data for each operational mode. The files and data stored in hard disk 302 can also be recorded in ROM 306.

Stored in ROM 306 are programs, data and the like necessary for controlling the operation of image forming apparatus 100. As the data stored in ROM 306 with the programs, the initial screen data for each operational mode may be stored. CPU 300 controls image forming apparatus 100 in accordance with the programs and data stored in ROM 306 and performs control associated with each function of image forming apparatus 100.

As shown in FIG. 3, a public line for exchange of image data is connected to FAX communicator 160 of this image forming apparatus 100 while a network line is connected to a network interface 304. This network line may be connected to a computers etc. that use this image forming portion 100 as a network printer or may be connected via the internet to a computer etc. that is identified by a designated URL (Uniform Resource Locator). When connected to the Internet in this way, the image forming apparatus 100 can obtain the necessary information via the Internet.

RAM 308 offers a function as a working memory for temporarily recording the result of the operation and processing by CPU 300 and a function as a frame memory for recording image data.

Control of image reader 102, image forming portion 104, touch panel display 130 and display control portion 140 forming control unit 120, ROM 306, hard disk 302 and RAM 308 is performed by CPU 300 executing predetermined programs. Here, control unit 120 communicates with CPU 300 by way of an input/output interface.

Control unit 120 is given as a board-like panel that is tilted so as to allow the user ease of view. Control unit 120 includes touch panel display 130 in the left area and display control portion 140 (including indication lamp 142 and hardware buttons, namely, power key 144, energy-save key 146 and home key 148) in the right area on the top thereof. Touch panel display 130 and display control portion 140 are integrally provided in control unit 120.

As described above, this touch panel display 130 is formed of display panel 132 and touch panel 134 that is laid over display panel 132.

Displayed on touch panel display 130 are the home screen for selection of the operational mode of image forming apparatus 100, the current status of this image forming apparatus 100, the status of destination selection, job processing status and the like.

Displayed on the display area of display panel 132 are selection buttons as software keys. When the displayed area of a selection button is pushed by a finger, touch panel 134 detects the pushed position. Then, the position on which touch panel 134 is pressed is compared with the positions of selection buttons so as to perform selection of an operational mode of image forming apparatus 100, functional setting, operational instructions, and the like. In addition to this touch control (command input control based on the position of the user's pressing), this image forming apparatus 100 also supports the above-mentioned gesture control (command input control based on the trace of user's control motion).

Further, indication lamp 142 of display control portion 140 is made up of a LED (Light Emitting Diode) for instance and is controlled by CPU 300 so as to turn on/off (/flash on and off). When the user presses down power key 144 that is provided separately in addition to the main power switch, this image forming apparatus 100 comes out of standby mode (in which, for example, only fax reception is permitted with the main power turned on) to active mode so that the whole operational modes of this image forming apparatus 100 can be used. Indication lamp 142 comes on in link with this status. Further, when a predetermined period has elapsed without receiving any user input, or when the user presses energy-save key 146, this image forming apparatus 100 comes out of active mode into energy save mode so that only part of the operational modes of image forming apparatus 100 are operational. Indication lamp 142 flashes on and off in link with this status. Further, when the user presses energy-save key 146 in this energy save mode, the image forming apparatus 100 comes out of energy save mode into active mode. Home key 148 is a hardware key for retuning the display of touch panel display 130 into the initial condition (home screen). It is noted that the operations when power key 144, energy-save key 146 and home key 148 are pressed should not be limited to these.

The hardware keys on display control portion 140 (power key 144, energy-save key 146 and home key 148) may be embedded with a key lamp controlled by CPU 300 so as to turn on/off (/flash). For example, this key lamp may be a round type key ring-like lighting or center lighting. This key lamp turns on at the timing that the hardware key is permitted to use as a control device (at the timing that operation is performed when the hardware key is used).

Image forming apparatus 100 has the aforementioned two operational modes (copy mode and facsimile mode). Software buttons for function settings in each operational mode are displayed on touch panel display 130, and also the preview as the on-screen form of forming images, keys for destination setting and the like are displayed as necessary.

When the operational mode is different from that which the user wants, touch panel display 130 displays another screen. Even in such a case, in order for the user to easily find the information the user requests, touch panel display 130 is divided into multiple regions (which also are given in a size variable manner) so as to display necessary information in each region.

In particular, in this image forming apparatus 100, when one operational mode is selected on the home screen of touch panel display 130 provided as the main display control device, the initial screen of the operational mode is displayed.

In this initial screen, (1) the basic layout is formed of five areas, namely "system region", "function selecting region", "preview region", "action panel region" and "task trigger region", which are appropriately arranged, so that the user is able to easily perform input of settings from top left to bottom right (in the same manner as the user moves their gaze and fingers in the conventional machine which is not provided with a large scale touch panel display 130). Further, (2) the concept of the displays of the five regions is consistent in all operational modes, so that the user is able to operate without confusion when another operational mode is used. The following description will be given on the configuration of the basic layout.

The basic layout in touch panel display 130 will be described with reference to the drawings.

As shown in FIG. 4, the basic layout of touch panel display 130 is designed in the laterally long touch panel display 130 such that a system region 1000 is arranged at the topmost part, a preview region 3000 in the center of the screen, a function settings/confirmation region 2000 on the left side of preview region 3000, an action panel region 4000 on the upper right part of preview region 3000, and a task trigger region 5000 on the lower right of preview region 3000. Here, the laterally long touch panel display 130 is formed of, for example, 1024 pixels wide×600 pixels high. Further, function settings/confirmation region 2000 will be written hereinbelow as function selecting region 2000.

It is noted that the number of regions in touch panel display 130 should not be limited to five. Also, the horizontal arrangement should not be limited so that the horizontal arrangement may be reversed right side left, for example, depending on the user's dominant hand. Further, the position of system region 1000 may be disposed at the lowermost part. Alternatively, the system region 1000 may be undisplayed depending on the status or settings.

System region 1000 displays the current status of this image forming apparatus 100, e.g., the title of the operational mode in control and the status and conditions of image forming apparatus 100. For example, displayed in system region 1000 are the name of operational mode, the cut-in key, the log-in user name, the job status in progress, the usage status of built-in memory, time and the like.

In function selecting region 2000, settings in each function, display switching, function selecting menu (icons, buttons, etc.) operated by user to confirm settings are variably displayed in a selected display style, i.e., in icon mode, regular mode or express mode.

In icon mode, only icons for function setting are displayed in function selecting region 2000 so as to maximize the size of preview region 3000.

In express mode, the display of function selecting region 2000 is enlarged so as to allow the user to set the function all at once though the size of preview region 3000 is minimized.

In regular mode, preview region 3000 is sized between that in the icon mode and that in the express mode while in function selecting region 2000 the text of function titles are displayed together with functional setting icons.

These icon mode, regular mode and express mode are switched from one to another based on user control. That is, the size of preview region 3000 is modified and displayed in accordance with user control. In this way, since icons are able to give information to the user by using limited area, it is preferable that every function is given with an icon so as to be able to enlarge the display of preview region 3000.

This function selecting region 2000 includes at its bottom a group of select buttons 2010 for switching the display style in function selecting region 2000.

Arranged in the group of select buttons 2010 are an icon mode entering button 2012 for displaying function selecting region 2000 in icon mode, a favorite button 2014 for displaying the functions registered as "favorites", a check button 2016 for displaying the functions whose settings have been modified, a list button 2018 for displaying a list of all the functions that can be designated in the selected operation mode, a regular mode entering button 2020 for displaying function selecting region 2000 in regular mode, and an express mode entering button 2022 for displaying function selecting region 2000 in express mode.

Here, when there are many pieces of information to be displayed in function selecting region 2000, the information is displayed in this function selecting region 2000, in a vertically scrolling manner. In this case, this group of select buttons 2010 is not scrolled but constantly displayed in the bottom-most portion of function selecting region 2000.

Preview region 3000 displays the image of the output pages of the (finished) document. The image is displayed using dummy data or scanned data, and the displayed image in preview region 3000 is revised every time the user changes the finish. There are two modes of displaying the finish in this preview region 3000: the display of the final preview with a dummy image in virtual mode before scanning and the display of the final preview with actual images in scan-in mode after scanning. The virtual mode further has two types, before setting documents and after setting documents.

At the bottom of this preview region 3000 there is a group of preview select buttons 3010 for changing the display style in preview region 3000.

The group of preview select buttons 3010 includes a rotate-left button 3016 for rotating the image left 90 degrees and a rotate-right button 3018 for rotating the image right 90 degrees and a zoom bar 3020. Other than these, for example a change color button 3012 and preview control button 3014 are arranged.

With this, when rotate-left button 3016 is touched once, the preview rotates 90 degrees left. When the button is touched twice, the preview is rotated 180 degrees left (inverted upside down). Alternatively, when the image of the finished document displayed in the preview region is gesture-controlled (by rotating the document image 180 degrees counterclockwise with the fingertip), the preview is rotated 180 degrees left or inverted upside down.

When rotate-right button 3018 is touched once, the preview rotates 90 degrees right. When the button is touched twice, the preview is rotated 180 degrees right (inverted upside down). Alternatively, when the image of the finished document displayed in the preview region is gesture-controlled (by rotating the document image 180 degrees clockwise with the fingertip), the preview is rotated 180 degrees right or inverted upside down.

When the (+) button 3020A of zoom bar 3020 is touched, or when bar 3020C is gesture-controlled (by the "drag or flick" gesture) toward the (+) button 3020A, the preview image is enlarged. Alternatively, when the image of the finished document displayed in the preview region is gesture-controlled (on the document image by the "pinch out/pinch open" gesture with fingertips), the preview image is enlarged. Here, the "drag" gesture is an action of moving the finger. The "flick" gesture is a swiping action of the finger. The "pinch out/pinch open" is an action of spreading the two fingertips apart.

When the (−) button 3020B of zoom bar 3020 is touched, or when bar 3020C is gesture-controlled (by the "drag or flick" gesture) toward the (−) button 3020B, the preview image is reduced. Alternatively, when the image of the finished document displayed in the preview region is gesture-controlled (on the document image by the "pinch in/pinch close" gesture with fingertips), the preview image is reduced. Here, the "pinch in/pinch close" is an action of bringing the two fingertips together.

When there are many pages of document images to be displayed in preview region 3000, touchable displayed page select buttons (page number input buttons, page up and down buttons, single page display button and multiple page display button, etc.) may be displayed. In this case, it is also possible to turn over or return the page of the document to be previewed by gesture control of the document image (a "flick" gesture). Further, when the document image to be displayed in preview region 3000 is large, scroll bars that can be touched or gesture-controlled may be displayed.

Action panel region 4000 displays information such as hint, advice and suggestion for operation and control. Display in this action panel region 4000 is given such that when a particular function is selected by a certain user, the functions associated with the subject function may be displayed, another function as to the subject function may be displayed in a purpose-oriented manner, or the function that was selected in the past in combination with the subject function by the same user or a user of the group to which this user belongs may be displayed as a "recommended function".

Task trigger region 5000 displays trigger items that the user operates in order to actually cause the image forming apparatus 100 to operate after all the settings in the operational mode have been completed. An example is the start button (software button) for starting the operation. Here, since information on a lack of a consumable supply is also related to the unfeasibility of the task in the operational modes needing a printing process (other than fax transmission), this should be also displayed in this "task trigger region".

In this case, it is also preferable that the start button is displayed only when the start button can be pressed down. The condition in which the start button can be pressed down, means a state where all settings have been completed and none of consumable supplies (recording paper and toner) will run short in the case of an operational mode needing a printing operation or a state where all the transmission parameters including destination have been set in the case of a fax mode (transmission) operation as the operational mode needing no printing.

The layout of these five regions is not changed even if the operational mode is switched from one to another (in the initial screen of any operational mode). Further, each region may change in size, expanding or contracting in the horizontal (longitudinal) direction of the screen of touch panel display 130 as in the case where the display of function selecting region 2000 (and preview region 3000) is switched between icon mode, regular mode and express mode.

The layout of the five regions is designed in light of the user interfaces in conventional machines, by directing attention to user's path of gaze and control. This arrangement leads the user to perform settings by moving their gaze from top left to bottom right and moving their input action (fingers of the dominant hand) from top left to bottom right.

In this arrangement, for switching the operational mode from one to another, the user presses down home key 148 (FIG. 3) and selects another operational mode on the home screen. In this way, it is possible to change operational mode by way of the home screen.

(Initial Screen Display Operation in Copy Mode)

When copy mode is selected, the initial screen for copy mode is displayed on touch panel display 130 using copy mode initial screen data loaded from hard disk 302 (FIG. 3) or the like.

In this occasion, a copy mode initial screen 7100 is displayed for example, on touch panel display 130, as shown in FIG. 5. Copy mode initial screen 7100 displays information using the five divided regions laid out as described above.

In system region 1000 (FIG. 4) of copy mode initial screen 7100, areas 1102, 1104, 1106, 1108, 1110, 1112, 1114 and 1116 are laid out as shown in FIG. 5.

Area 1102 denotes the operational mode being selected (copy mode in this case).

Displayed in area 1102 is the name and/or icon of the operational mode.

It is also preferred that a pulldown menu showing operational modes is displayed so as to allow for switching of operational mode when this area 1102 is touch-controlled, tapped or double-tapped (the same in other operational modes).

Area 1104 displays sub information entailing the selected operational mode.

In area 1104 a cut-in key (software button) is displayed as sub information. When this cut-in key is touch-controlled, tapped or double-tapped, a cut-in process can be actuated in copy mode.

Area 1106 displays the log-in user name.

In area 1108 a log-out button (software button) is displayed.

Area 1110 displays the status of the job in progress.

Area 1112 displays buttons (software buttons) related to job status.

That is, area 1112 displays the status of the job in progress with an icon. This job status is touch-controlled, tapped or double-tapped, the job status information is displayed in detail. It is further preferable that a button for suspending the selected job and the like is displayed in area 1112.

Area 1114 displays the communication status and area 1116 displays the current time.

Displayed in function selecting region 2000 (FIG. 4) on copy mode initial screen 7100 are a function selecting menu 2100 that allows the user to select in copy mode and a group of select buttons 2010 described above. In the screen shown in FIG. 5, the function select menu is displayed in regular mode.

As shown in FIG. 5, the function select menu displayed in regular mode is composed of a group of icons 2100 and a group of texts 2120.

As the function select menu displayed in function selecting region 2000, texts 2122, 2124, 2126, 2128, 2130, 2132, 2134 and 2136 are displayed.

Text 2122 shows an icon 2102 for setting the number of copies and its set content.

Text 2124 shows an icon 2104 for setting color mode and its set content.

Text 2126 shows an icon 2106 for setting copy density and its set content.

Text 2128 shows an icon 2108 for setting copy magnification and its set content.

Text 2130 shows an icon 2110 for setting the document type and its set content.

Text 2132 shows an icon 2112 for setting the paper type and its set content.

Text 2134 shows an icon 2114 for image edition and its set content.

Text 2136 shows an icon 2116 for layout edition and its set content.

Here, it should be noted that a greater number of items can be also displayed in the function setting menu, in a vertically scrolling manner with the position of select buttons 2010 fixed. In this case, the displayed items inclusive of hidden items above and below, can be changed from one to another by any of touch control (scroll control) and gesture control (flick control in the vertical direction).

Here, the image edition is edition for one page document, and includes, as a lower-layered menu, frame deletion, printing menu, watermark, user stamp and the like. The layout edition is edition for multiple pages of documents, and includes, as a lower-layered menu, page integration, binding margins, page change, centering and the like. Subordinates menus under these will be displayed on touch panel display 130 by touching, taping or double-tapping icons 2102 to 2116 or texts 2112 to 2136.

Arranged in preview region 3000 (FIG. 4) on copy mode initial screen 7100 are a document output (finish) image 3100 and a group of preview select buttons 3010 stated above. In this arrangement, dummy data or scanned data is used to display image 3100, and the image 3100 is changed and displayed on preview region 3000 every time the function setting menu in function selecting region 2000 is changed (the preview display is changed).

Displayed in action panel region 4000 (FIG. 4) on copy mode initial screen 7100 is information such as hint, advice and suggestion for copying operation. Here, recommended functions in the copy mode that the user selects are displayed as shown in FIG. 5. In this case, action panel region 4000 includes an area 4100 for displaying the content of displayed information and areas 4102 to 4106 that serve in themselves as software buttons and display text indicating recommended functions.

When area 4102 is touch-controlled, tapped or double-tapped, a pulldown menu of further detailed information for energy-saving in copying is displayed. In this case, for example a software button for entering the function setting screen for duplex copying is displayed with text "Duplex printing will save paper", a software button for entering the function setting screen for page integration with text "Printing multiple documents integrally will save paper", and a software button for entering the function setting screen for saddle stitch binding with text "Printing can be done so as to bind the paper as a booklet".

Displayed in task trigger region 5000 (FIG. 4) on copy mode initial screen 7100 is a group of command buttons 5100. These command buttons 5100 include a scan-in key (software button) 5102, a clear-all key (software button) 5104, a monochrome start key (software button) 5106 and a color start key (software button) 5108.

Scan-in key 5102 is a key for causing image forming apparatus 100 to scan a document to obtain image data.

Clear-all key 5104 is a key for clearing the set functions.

Monochrome start key 5106 is a key for causing image forming apparatus 100 to scan a document and perform monochrome copying.

Color start key 5108 is a key for causing image forming apparatus 100 to scan a document and perform color copying.

In this way, when the user inputs a request in copy mode initial screen 7100 displayed with information in five-divided regions, a copying process is effected in accordance with the request.

Next, description will be made on the switching operation of preview pages when preview region 3000 (FIG. 4) is enlarged with function selecting region 2000 (FIG. 4) displayed in icon mode.

When the user flicks left the preview display screen in which a preview image 3118 is displayed as shown in FIG. 6, the input trace is analyzed. In this case, the gesture control by this user is analyzed as a request for turning over the page, and a revised preview image including another page that has not been displayed and corresponds to the direction of the flick is displayed.

It is also possible to change the pages in preview image representation by touching a page forward button 3118G, page fast forward button 3118H, page reverse button 3118E or page fast reverse button 3118D. It is also possible to change the pages in preview image representation by touching a direct pagination button 3118F to directly input the page number the user wants to jump.

In this way, when function selecting region 2000 is displayed in icon mode, preview region 3000 is enlarged so that it is possible to display the preview image so as to improve user' visual recognition and user controllability, as shown in FIG. 6. In particular, it is possible to scroll the preview display up to a preview image the user wants by touch control or gesture control, and display the desired preview image.

Here, designated at 3118A in FIG. 6 is a trash icon. When a selected page is dragged to this trash icon 3118A, the page can be deleted.

When a single page display icon 3118B is pressed down, the preview image with, for example three pages displayed, is changed to one page representation (in this case one page is displayed in a large scale). When a multiple page display icon 3118C is pressed down, the preview image with, for example, one page displayed, is changed to three page representation.

Next, the configuration of control unit 120 (FIGS. 1 and 3) will be described in detail with reference to the drawings.

Figure 7:
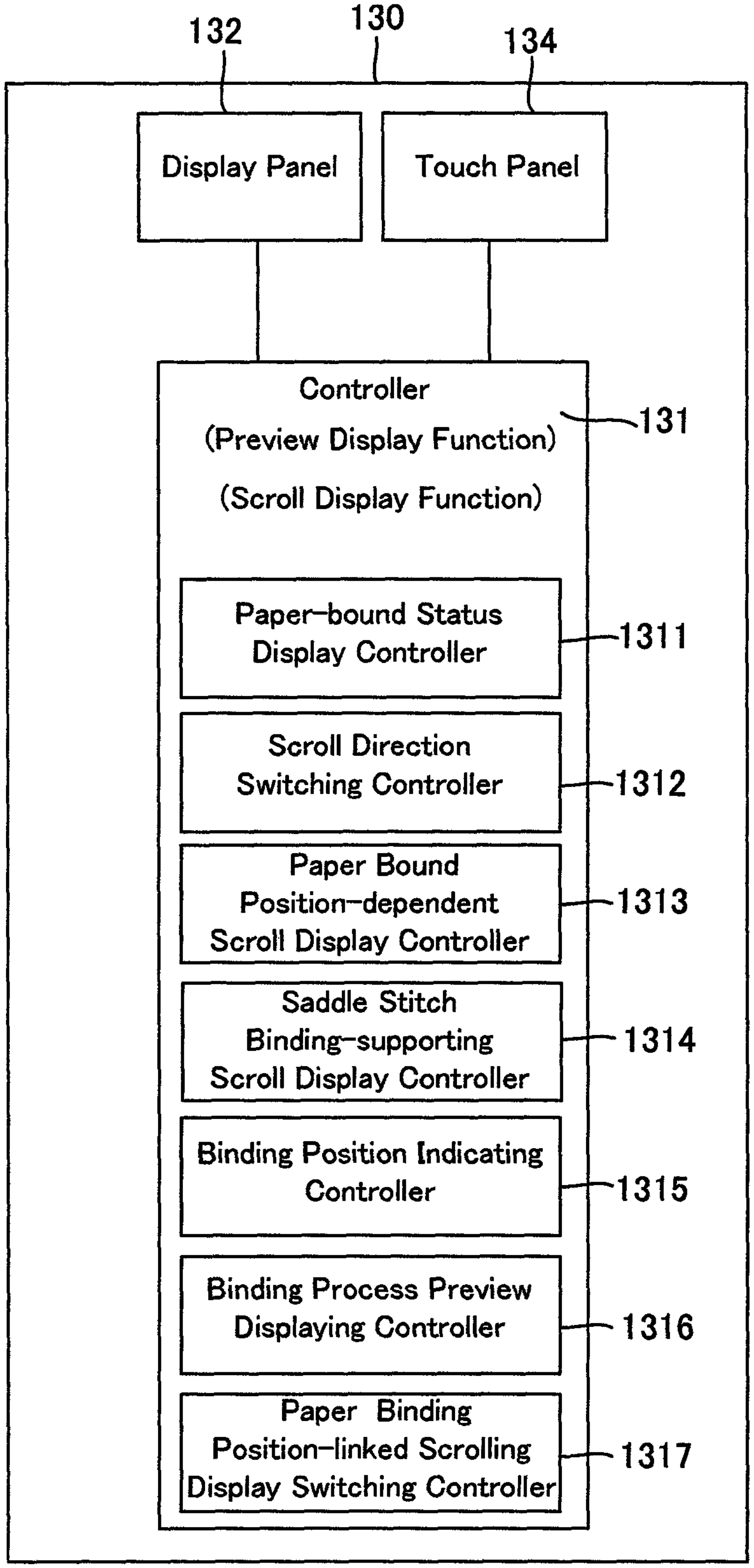
FIG. 7 is a block diagram showing a configuration of the touch panel display.

FIG. 7 is a block diagram showing the configuration of the touch panel display of the control unit of the image forming apparatus of the present embodiment.

Control unit 120 according to the present embodiment includes, in addition to the components described above, a controller 131 that controls the preview display function for performing preview display of multiple pages of document images on display panel 132 and the scroll display function for performing scroll display of multiple pages of document images given in preview representation, as shown in FIG. 7.

Controller 131 of touch panel display 130 functioning as a display control means includes a paper-bound status display controller 1311 and a scroll direction switching controller 1312.

When the printed paper (recording medium) is bound after document images are formed, paper-bound status display controller 1311 controls the preview frame including multiple page of preview images 135 to be displayed on display panel 132 such that the page document images on display panel 132 are arrayed in either the vertical direction or the horizontal direction, depending on the binding position of the printed paper.

Scroll direction switching controller 1312 selects the direction of scrolling preview images 135, either the vertical direction or the horizontal direction with respect to display panel 132.

Controller 131 includes a paper bound position-dependent scroll display controller 1313 for scrolling preview images 135 in the direction that crosses the side edge along which the printed paper of preview images 135 displayed on display panel 132 is bound.

In other words, when the printed paper is bound along the side edge that extends in the vertical direction on display panel 132, paper bound position-dependent scroll display controller 1313 controls the direction of scrolling preview images 135 such as to be the direction crossing the side edge extending in the vertical direction, or to be the horizontal (left-and-right) direction on display panel 132. When the printed paper is bound along the side edge that extends in the horizontal direction on display panel 132, the direction of scrolling preview images 135 is controlled such as to be the vertical (top-and-down) direction on display panel 132.

Further, controller 131 includes a saddle stitch binding-supporting scroll display controller 1314 for scrolling preview images 135 in the direction crossing the saddle stitching line (the fold when the paper is folded along the saddle stitching position) of the printed paper of preview images 135 displayed on display panel 132.

In other words, in the case where the printed paper is bound along the saddle stitching line, when the saddle stitching line extends in the vertical direction on display panel 132, saddle stitch binding-supporting scroll display controller 1314 controls the direction of scrolling preview images 135 such as to be the direction crossing the vertical saddle stitching line, or to be the horizontal (left-and-right) direction on display panel 132. When the saddle stitching line extends in the horizontal direction on display panel 132, the direction of scrolling preview images 135 is controlled such as to be direction crossing the horizontal saddle stitching line or the vertical (top-and-down) direction on display panel 132.

Further, controller 131 includes a binding position indicating controller (binding position indicating function) 1315, a binding process preview displaying controller (binding process preview displaying function) 1316 and a paper binding position-linked scrolling display switching controller (scrolling display switching function) 1317.

Binding position indicating controller 1315 indicates a binding position in printed paper when a binding step is implemented after document images are recorded on the printed paper.

Binding process preview displaying controller 1316 displays a preview image of the recording paper bound at the binding position designated by binding position indicating controller 1315.

Paper binding position-linked scrolling display switching controller 1317, when the binding position in printed paper is changed by binding position indicating controller 1315, switches the scroll display mode of the preview image of printed paper such that the direction of scrolling is suited to the bound recording paper.

Now, the distinctive preview display of document images on touch panel display 130 will be specifically described with reference to the drawings.

Here, the following description will be given on a display style in which preview display of document images is performed using the whole touch panel display. However, preview display may be given in preview region 3000 (FIG. 4) or preview display may be given on the enlarged preview region 3000 with function selecting region 2000 (FIG. 4) displayed in icon mode, as in the forgoing description.

Figures 8A, 8B, 8C:
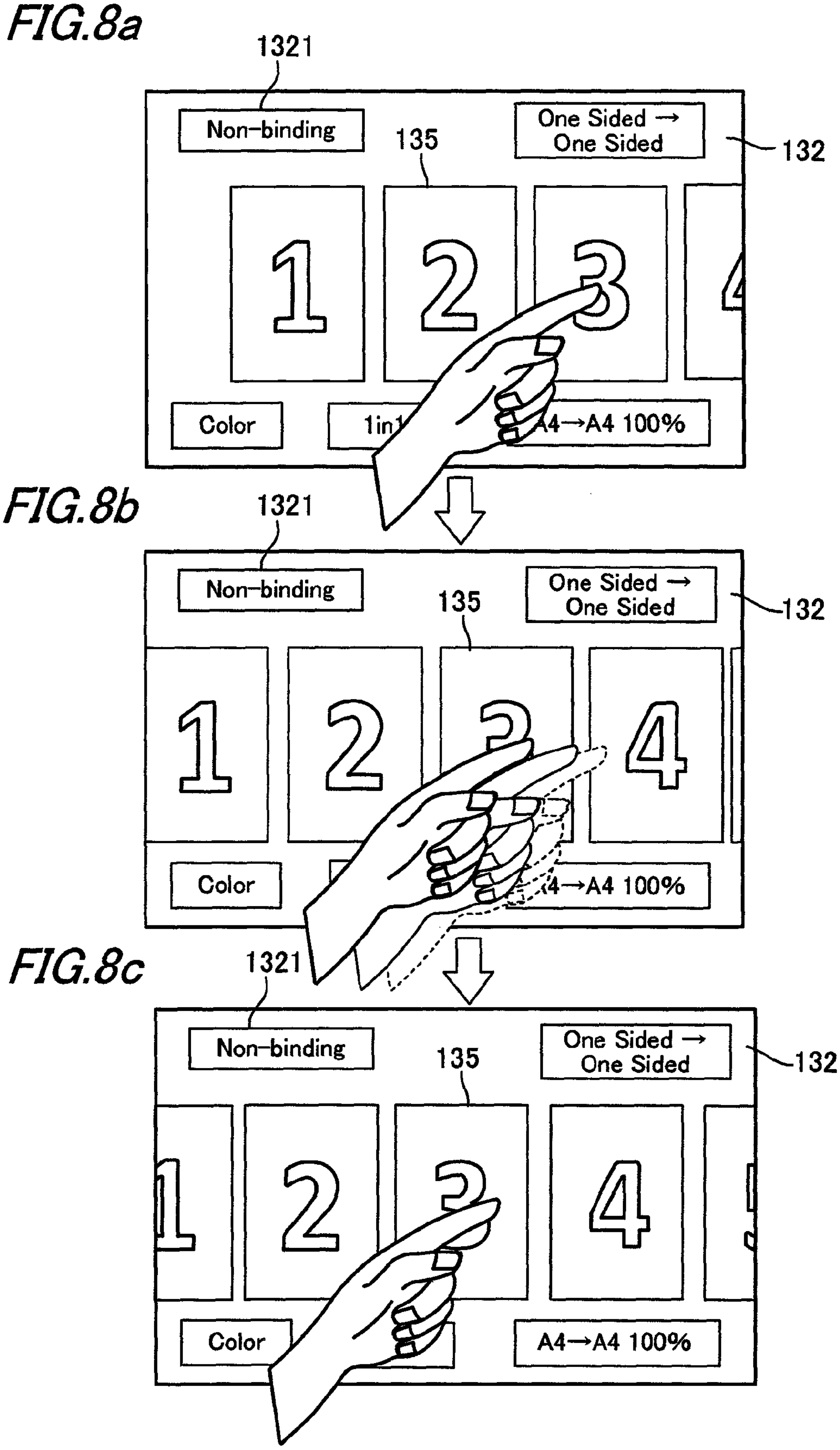
FIGS. 8*a* to 8*c* are illustrative views showing states where document images are displayed laterally in preview representation on the touch panel display.
Figure 9A:
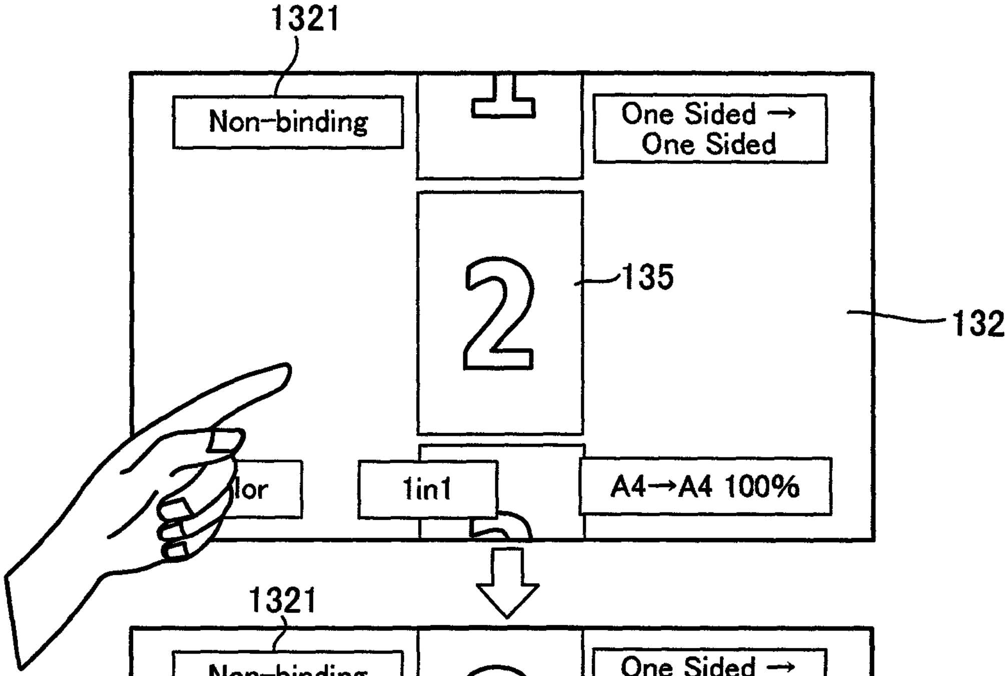
FIGS. 9*a* to 9*c* are illustrative views showing states where document images are displayed vertically in preview representation on the touch panel display.
Figure 9B:
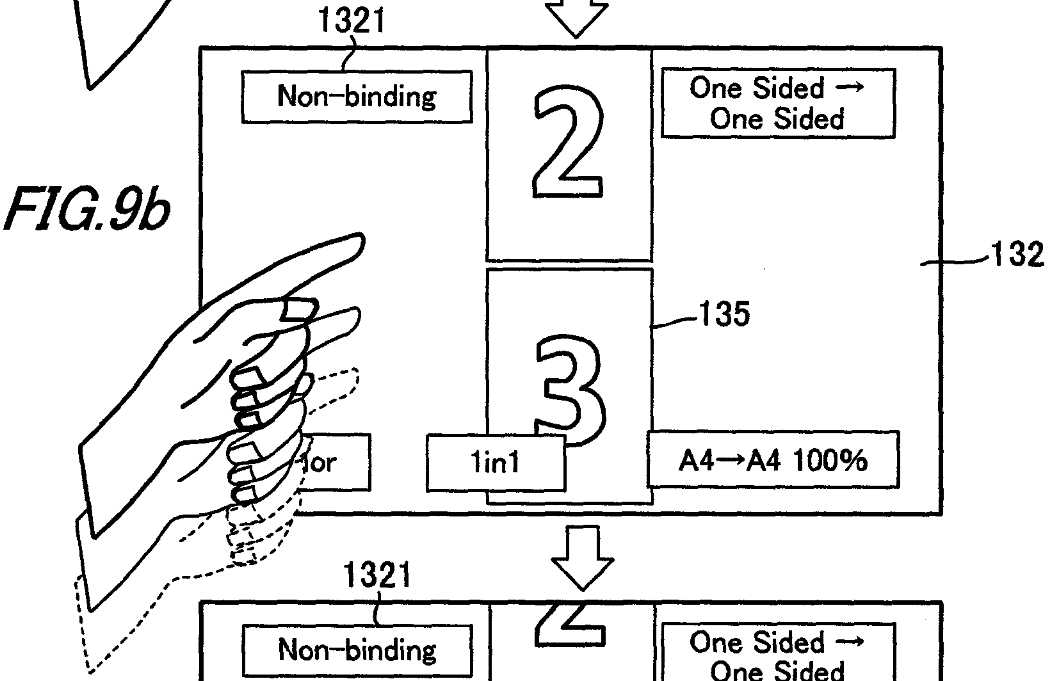
Figure 9C:
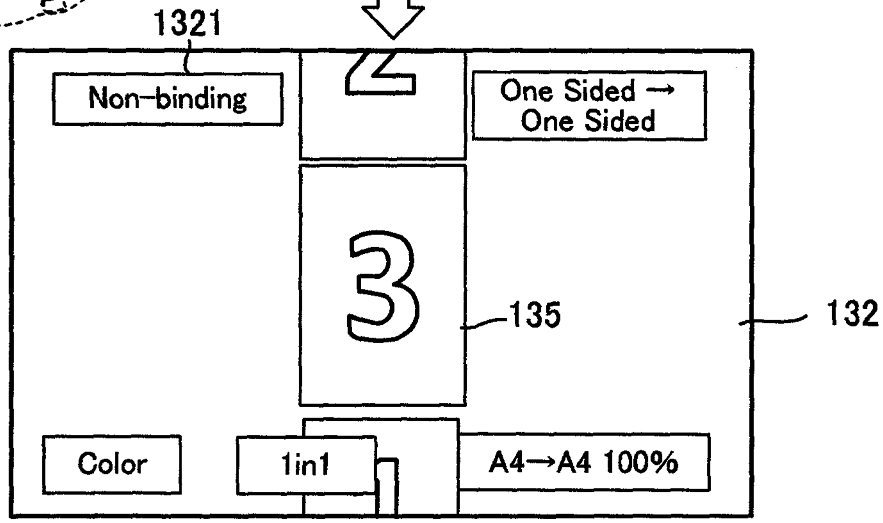

FIGS. 8*a* to 8*c* are illustrative views showing the states where document images are displayed laterally in preview representation on the touch panel display of the present embodiment. FIGS. 9*a* to 9*c* are illustrative views showing the states where document images are displayed vertically in preview representation on the touch panel display.

When the printing content is checked before printing in image forming apparatus 100, multiple pages of data to be printed are displayed on display panel 132 of touch panel display 130 in a preview form so that all the pages are displayed as a whole.

When images of portrait documents are arranged laterally and displayed in preview representation on touch panel display 130, the document images are scroll-displayed in order of 1, 2, 3, . . . from the left to the right on display panel 132, as shown in FIGS. 8*a* to 8*c*.

When images of portrait documents are arranged vertically and displayed in preview representation, the document images are scroll-displayed in order of 1, 2, 3, . . . from top to bottom on display panel 132, as shown in FIGS. 9*a* to 9*c*.

When the document images displayed on display panel 132 are scrolled, the finger is put in touch with one of the document images on display panel 132 and slid, as shown in FIGS. 8*a* to 8*c* and 9*a* to 9*c*, so that it is possible to scroll the images in the sliding direction.

In FIGS. 8*a* to 8*c*, when the user touches the screen with the finger, and slides or flicks the finger from the right to the left of the screen, in the preview display in which document images input to the apparatus are arranged and displayed sequentially page-wise from the left to the right of the screen, the multiple document images are scrolled sequentially from the right to the left, to thereby display the documents from the 4th page forward, on the screen.

In FIGS. 9*a* to 9*c*, when the user touches the screen with the finger, and slides or flicks the finger from the bottom to the top of the screen, in the preview display in which document images input to the apparatus are arranged and displayed sequentially page-wise from the top to the bottom of the screen, the multiple document images are scrolled sequentially from the bottom to the top, to thereby display the documents from the 3rd page forward, on the screen.

In either of FIGS. 8*a* to 8*c* and FIGS. 9*a* to 9*c* stated above, the images of pages of the recorded matter are arranged so that each page can be recognized in a feeling as if the user is turning over the page of the recorded matter.

Further, a soft key (non-binding) 1321 for setting the "binding position" is displayed at the upper left of the display screen in display panel 132. When the user touches this soft key 1321, an entry of the desired setting of a binding position is confirmed through touch panel 134 (FIG. 7) that is laid over display panel 132.

At this time, as the options, "Binding Position: Right", "Binding Position: Left", "Binding Position: Right", "Binding Position: Top", "Binding Position: Right Top", "Binding Position: Left Top" and "Binding Position: Center" are displayed under soft key 1321, i.e., "Non-Binding", so that the user can select the desired position of stapling.

Here, though in the present embodiment the document images are moved by scrolling on display panel 132, the movement of the document images in the indicated direction can be attained when the documents are shifted by switching the display content of display panel 132 from one to another.

Next, in image forming apparatus 100, the preview display of document images when the printed paper is to be bound after printing will be described.

Figure 10:
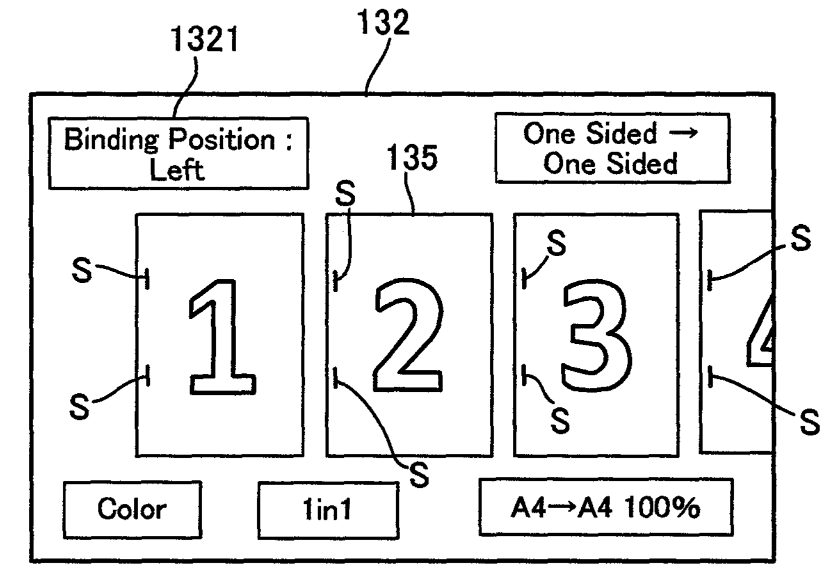
FIG. 10 is an illustrative view showing a state of document images in preview representation on the touch panel display when the left vertical edge of the printed paper is bound.
Figure 11:
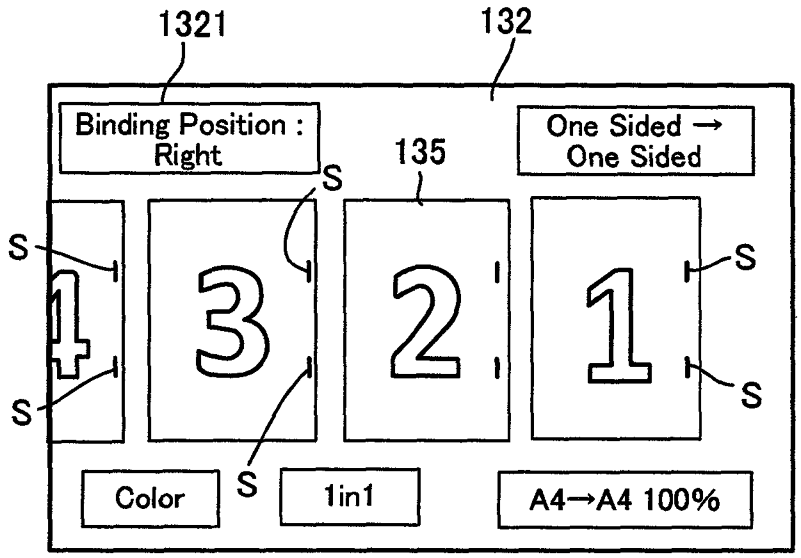
FIG. 11 is an illustrative view showing a state of document images in preview representation on the touch panel display when the right vertical edge of the printed paper is bound.
Figure 12:
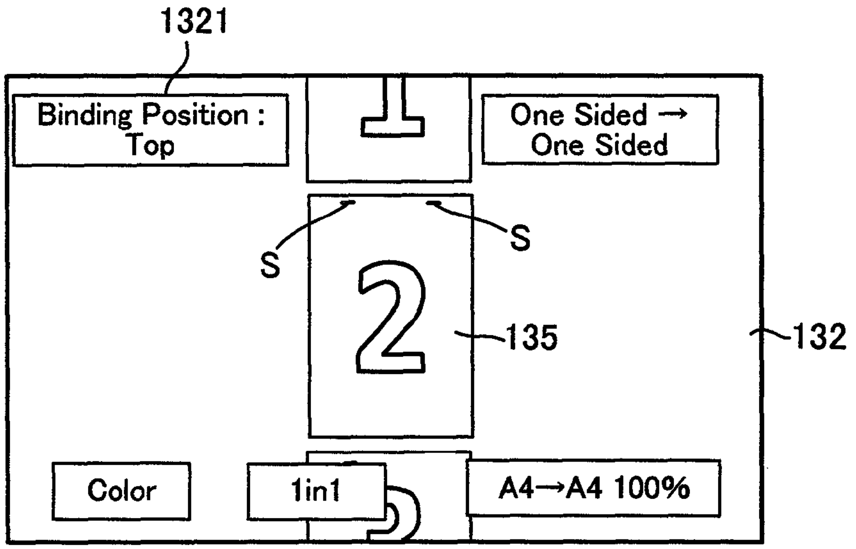
FIG. 12 is an illustrative view showing a state of document images in preview representation on the touch panel display when the top horizontal edge of the printed paper is bound.
Figure 13:
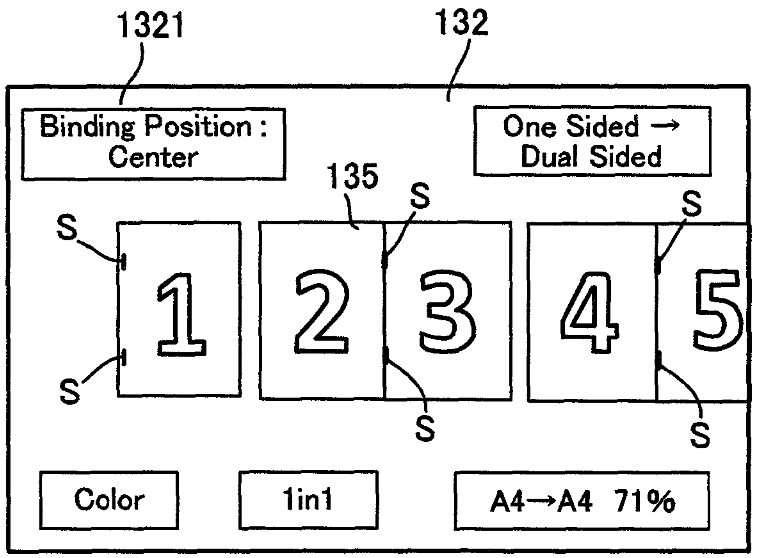
FIG. 13 is an illustrative view showing a state of document images in preview representation on the touch panel display, where the printed paper is bound along the vertical fold by saddle stitch binding and used as a left-bound booklet.
Figure 14:
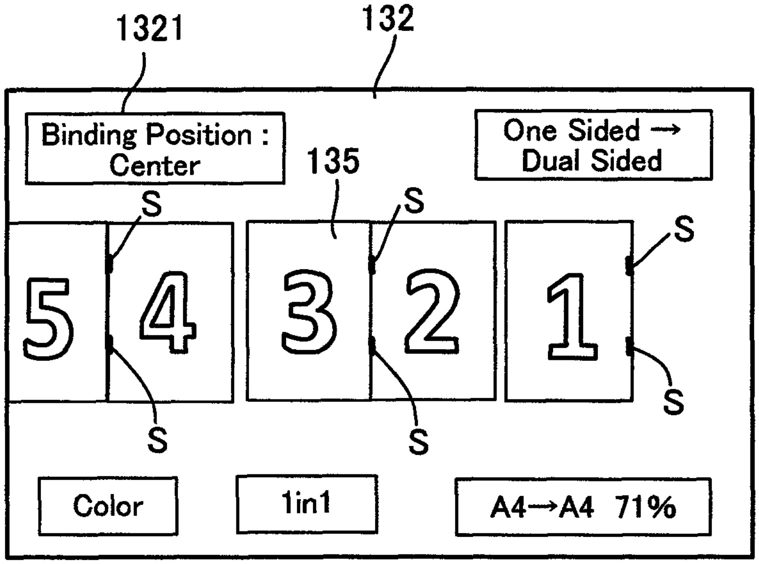
FIG. 14 is an illustrative view showing a state of document images in preview representation on the touch panel display, where the printed paper is bound along the vertical fold by saddle stitch binding and used as a right-bound booklet.
Figure 15:
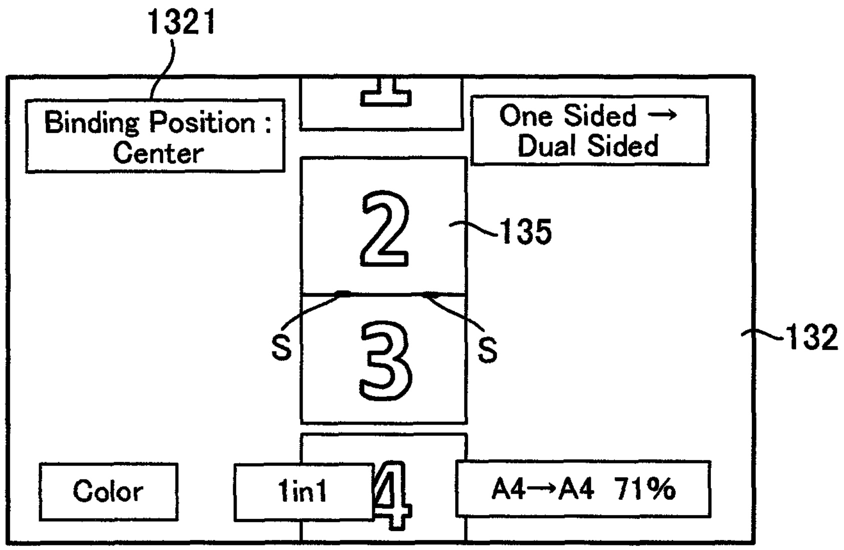
FIG. 15 is an illustrative view showing a state of document images in preview representation on the touch panel display, where the printed paper is bound along the horizontal fold by saddle stitch binding and used as a top-bound booklet.

FIG. 10 is an illustrative view showing a state of document images in preview representation on the touch panel display of the present embodiment when the left vertical edge of the printed paper is bound. FIG. 11 is an illustrative view showing a state of document images in preview representation on the touch panel display when the right vertical edge of the printed paper is bound. FIG. 12 is an illustrative view showing a state of document images in preview representation on the touch panel display when the top horizontal edge of the printed paper is bound. FIG. 13 is an illustrative view showing a state of document images in preview representation on the touch panel display, where the printed paper is bound along the vertical fold by saddle stitch binding and used as a left-bound booklet. FIG. 14 is an illustrative view showing a state of document images in preview representation on the touch panel display, where the printed paper is bound along the vertical fold by saddle stitch binding and used as a right-bound booklet. FIG. 15 is an illustrative view showing a state of document images in preview representation on the touch panel display, where the printed paper is bound along the horizontal fold by saddle stitch binding and used as a top-bound booklet.

In a case where the paper after printing in image forming apparatus 100 is bound along the left vertical edge, when images of portrait documents are displayed in preview representation, the document images are arranged laterally in order of 1, 2, 3, . . . from the left to the right on display panel 132 and displayed in a scrolling manner with binding positions S displayed next to the left vertical edge of each document image, as shown in FIG. 10.

On the other hand, in a case where the paper after printing is bound along the right vertical edge, when images of portrait documents are displayed in preview representation, the document images are arranged laterally in order of 1, 2, 3, . . . from the right to the left on display panel 132 and displayed in a scrolling manner with binding positions S displayed next to the right vertical edge of each document image, as shown in FIG. 11.

Further, in a case where the paper after printing is bound along the top horizontal edge, when images of portrait documents are displayed in preview representation, the document images are arranged vertically in order of 1, 2, 3, . . . from top to bottom on display panel 132 and displayed in a scrolling manner with binding positions S displayed next to the top horizontal edge of each document image, as shown in FIG. 12.

Referring next to the drawings, description will be made on preview display of document images in image forming apparatus 100 when the printed paper is saddle-bound after printing.

FIGS. 13, 14 and 15 show different patterns of switching the direction of scrolling preview images depending on the binding position S of printed paper when, of so-called "saddle binding", the resultant booklet is left-bound, right-bound and top-bound, respectively.

In image forming apparatus 100 of the present embodiment, when the printed paper after printing is saddle-stitched vertically into a left-bound portrait booklet, the preview of document images in portrait position is displayed in a scrollable manner so that the binding position S is displayed at the center line along which the printed paper is halved into left and right parts while pages of document images are laid out horizontally from the left to the right on display panel 132, in order of 1, 2, 3 . . . , as shown in FIG. 13.

On the other hand, when the printed paper after printing is saddle-stitched vertically into a right-bound portrait booklet, the preview of document images in portrait position is displayed in a scrollable manner so that the binding position S is displayed at the center line along which the printed paper is halved into left and right parts while pages of document images are laid out horizontally from the right to the left on display panel 132, in order of 1, 2, 3 . . . , as shown in FIG. 14.

Further, when the printed paper after printing is saddle-stitched horizontally into a top-bound landscape booklet, the preview of document images in landscape position is displayed in a scrollable manner so that the binding position S is displayed at the center line along which the printed paper is halved into top and bottom parts while pages of document images are laid out vertically from the top to the bottom on display panel 132, in order of 1, 2, 3 . . . , as shown in FIG. 15.

Here, the binding positions S on the printed paper shown in FIGS. 10, 11, 12, 13, 14 and 15 are displayed as the positions for stapling by a binding position indicating means 1315.

As described above, since preview images of document images are adapted to be displayed on display panel 132 in accordance with the binding position S on the paper after printing, by scrolling the document images horizontally when the binding position S is positioned along the left edge/right edge and by scrolling the document images vertically when the binding position S is positioned along the top edge it is possible to check the display content in a similar feeling as if the user is turning over pages by actually holding the bound position S of the printed matter.

Next, in image forming apparatus 100 of the present embodiment, a case where the setup of the binding position S for binding the printed paper is modified will be described with reference to the accompanying drawings.

First of all, description will be made on the case where the binding position S of the paper printed by image forming apparatus 100 is changed from the left vertical edge to the right vertical edge.

Figure 16A:
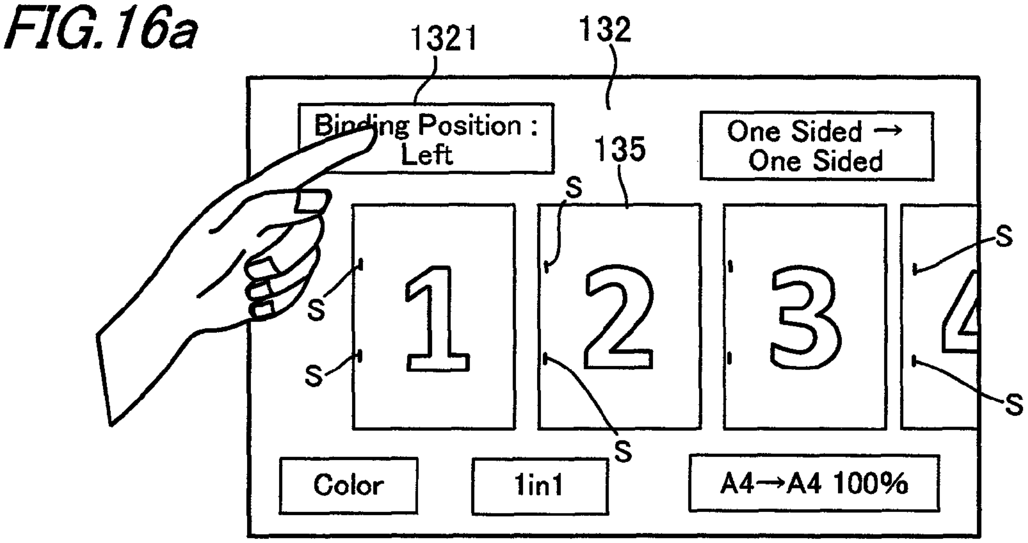
FIG. 16*a* is an illustrative view showing a state of printed paper in preview representation on the touch panel display, where the printed paper is bound along the left vertical edge of the printed paper.
Figure 16B:
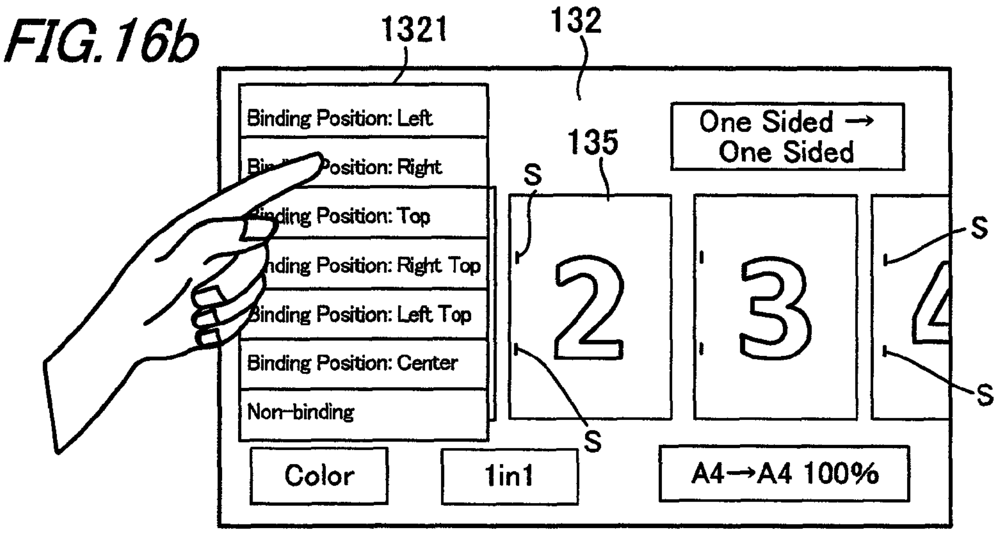
FIG. 16*b* is an illustrative view showing a state where the binding position of the printed paper is going to be changed to the right vertical edge.
Figure 16C:
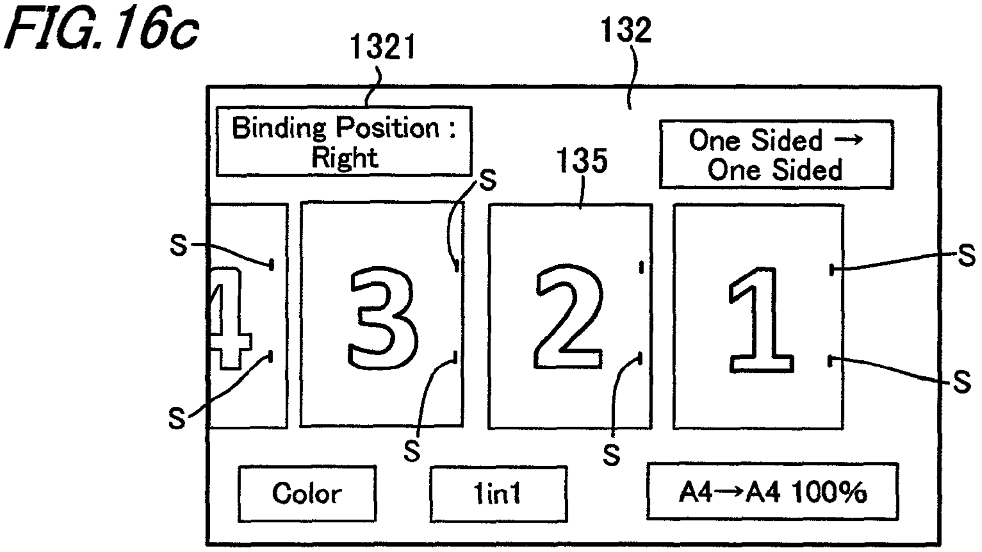
FIG. 16*c* is an illustrative view showing a state where the binding position of the printed paper has been changed to the right vertical edge.

FIG. 16*a* is an illustrative view showing a state of printed paper in preview representation on the touch panel display of the present embodiment, where the printed paper is set to be bound along the left vertical edge of the printed paper. FIG. 16*b* is an illustrative view showing a state where the binding position S of the printed paper is going to be changed to the right vertical edge. FIG. 16*c* is an illustrative view showing a state where the binding position S of the printed paper has been changed to the right vertical edge.

In image forming apparatus 100, when the paper after printing is bound along the left vertical edge, soft key 1321 is set with "Binding Position: Left", as shown in FIG. 16*a*.

When the binding position S of the printed paper is changed to the right vertical edge, soft key 1321 is touched as shown FIG. 16*a* so as to select an option "Binding Position: Right" from the options displayed under soft key 1321, "Binding Position: Left", "Binding Position: Right", "Binding Position: Top", "Binding Position: Right Top", "Binding Position: Left Top" and "Binding Position: Center", as shown in FIG. 16*b*.

When "Binding Position: Right" is selected, the preview on display panel 132 is changed as shown in FIG. 16*c* so that binding position S of the printed paper is displayed along the right vertical edge while the direction of scrolling is switched so that the display screen can be scrolled from the left to the right.

As a result, the operativity of control on display panel 132 is switched from the state of feeling as if the user turns over pages of the printed paper bound at the left edge (the display screen is scrolled from the right to the left) to the state of feeling as if the user turns over pages bound at the right edge (the display screen is scrolled from the left to right).

Further, when the state in which "Binding Position: Right" is selected is changed to the state in which "Binding Position: Left" is selected, the direction of scrolling is switched in reverse from that in the above description.

Next, description will be made on the case where the binding position S of the paper printed by image forming apparatus 100 is changed from the left vertical edge to the top horizontal edge of the printed paper.

Figure 17A:
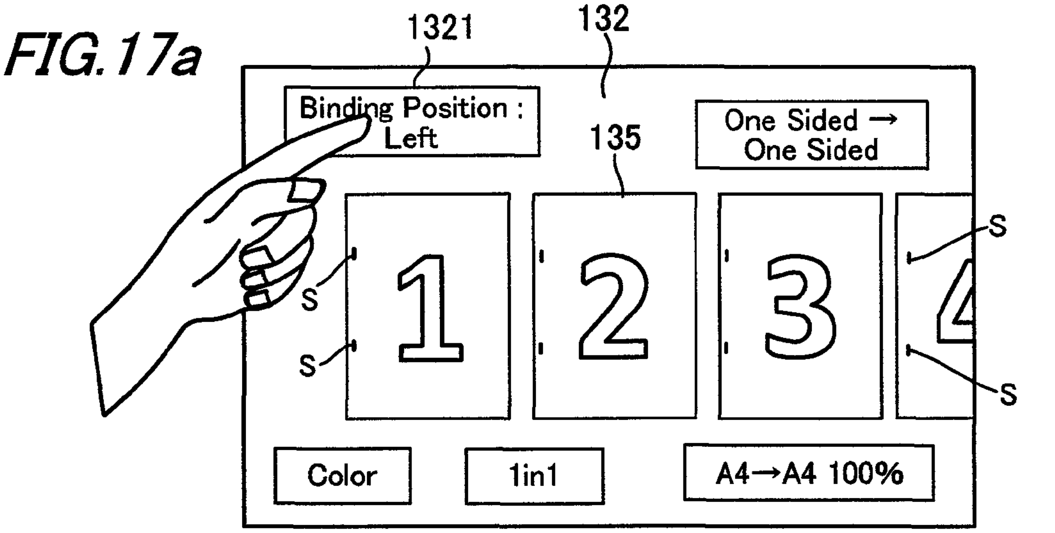
FIG. 17*a* is an illustrative view showing a state of printed paper in preview representation on the touch panel display, where the printed paper is bound along the left vertical edge of the printed paper.
Figure 17B:
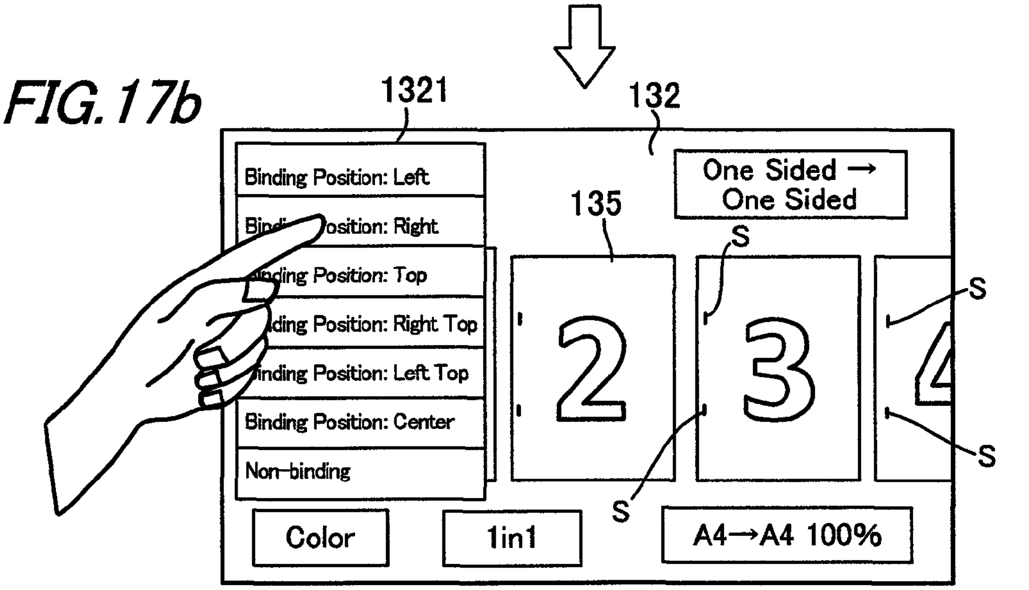
FIG. 17*b* is an illustrative view showing a state where the binding position of the printed paper is going to be changed to the top horizontal edge.
Figure 17C:
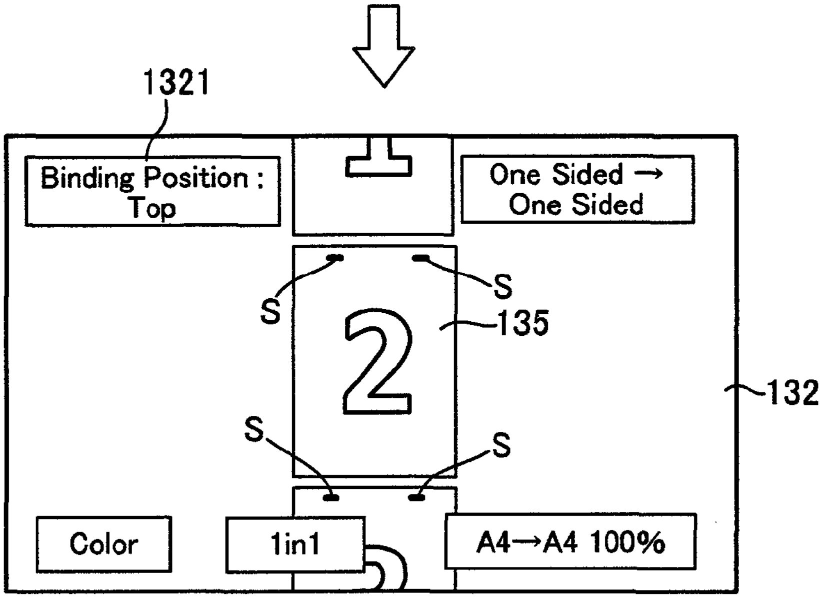
FIG. 17*c* is an illustrative view showing a state where the binding position of the printed paper has been changed to the top horizontal edge.

FIG. 17*a* is an illustrative view showing a state of printed paper in preview representation on the touch panel display of the present embodiment, where the printed paper is bound along the left vertical edge of the printed paper. FIG. 17*b* is an illustrative view showing a state where the binding position of the printed paper is going to be changed to the top horizontal edge. FIG. 17*c* is an illustrative view showing a state where the binding position of the printed paper has been changed to the top horizontal edge.

In image forming apparatus 100, when the paper after printing is bound along the left vertical edge, soft key 1321 is set with "Binding Position: Left", as shown in FIG. 17*a*.

When the binding position S of the printed paper is changed to the top horizontal edge, soft key 1321 is touched as shown FIG. 17*a* so as to select an option "Binding Position: Top" from the options displayed under soft key 1321, "Binding Position: Left", "Binding Position: Right", "Binding Position: Top", "Binding Position: Right Top", "Binding Position: Left Top" and "Binding Position: Center", as shown in FIG. 17*b*.

When "Binding Position: Top" is selected, the preview on display panel 132 is changed as shown in FIG. 17*c* so that binding position S of the printed paper is displayed along the top horizontal edge while the direction of scrolling is switched so that the display screen can be scrolled from the bottom to the top.

As a result, the operativity of control on display panel 132 is switched from the state of feeling as if the user turns over pages of the printed paper bound at the left edge (the display screen is scrolled from the right to the left) to the state of feeling as if the user turns over pages bound at the top edge (the display screen is scrolled from the bottom to the top).

As a variational example, when the state in which the binding position S on the printed paper is modified from "Binding Position: Right" to "Binding Position: Top", the operativity of control is switched from the state of feeling as if the user turns over pages of the printed paper bound at the right edge (the display screen is scrolled from the left to right) to the state of feeling as if the user turns over pages bound at the top edge (the display screen is scrolled from the bottom to the top).

Further, when the state in which "Binding Position: Top" is selected is changed to the state in which "Binding Position: Right" or "Binding Position: Left" is selected, the direction of scrolling is switched in reverse from that in the above description.

Next, description will be made on the case where the binding position S of the paper printed by image forming apparatus 100 is changed from the top horizontal edge to the saddle stitching position along which the printed paper is halved in the center into top and bottom parts.

Figure 18A:
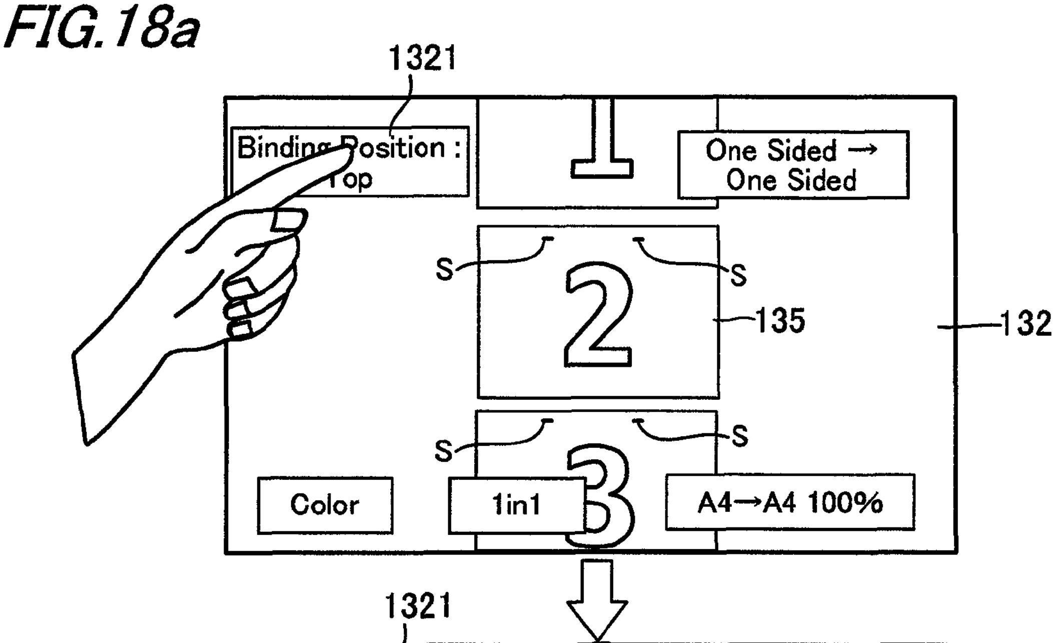
FIG. 18*a* is an illustrative view showing a state of printed paper in preview representation on the touch panel display, where the printed paper is placed in landscape position and set to be bound along the top horizontal edge.
Figure 18B:
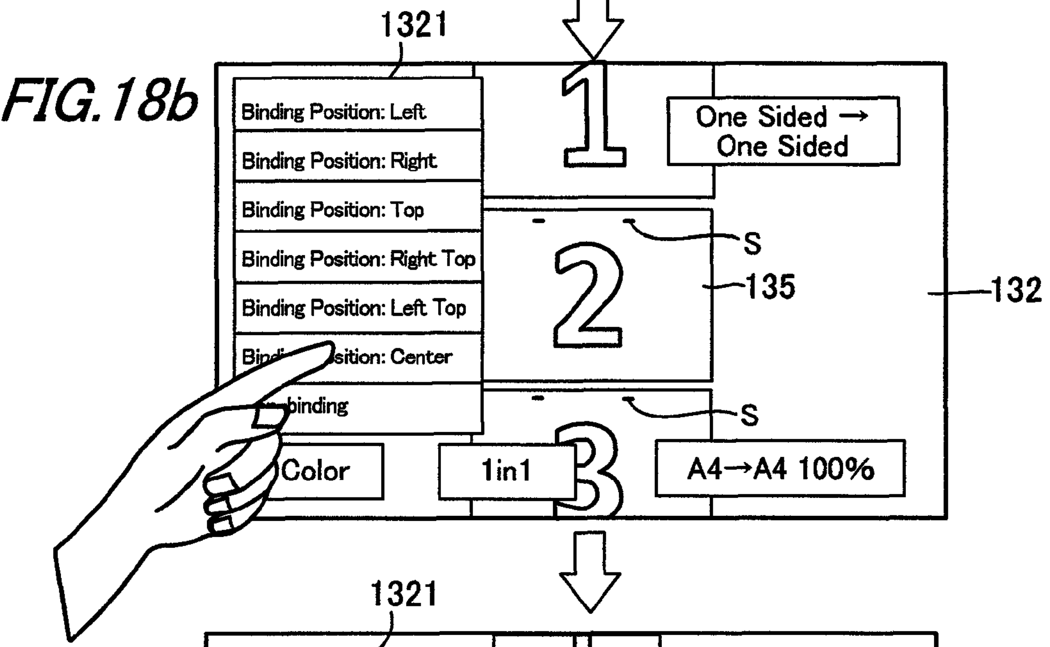
FIG. 18*b* is an illustrative view showing a state where the binding position of the printed paper is going to be changed to the position where the printed paper placed in portrait position is halved in the center into top and bottom parts.
Figure 18C:
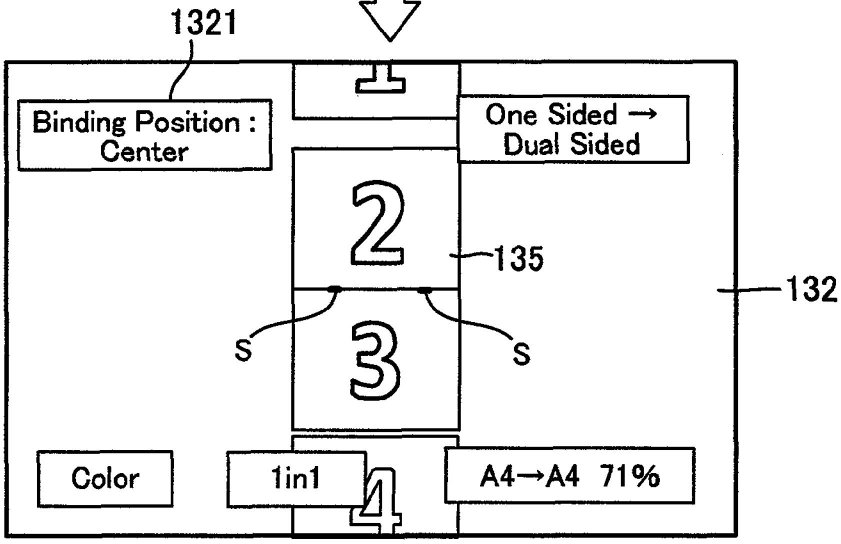
FIG. 18*c* is an illustrative view showing a state where the binding position of the printed paper has been changed to the position where the printed paper is halved in the center into top and bottom parts.

FIG. 18*a* is an illustrative view showing a state of printed paper in preview representation on the touch panel display of the present embodiment, where the printed paper is placed in landscape position and set to be bound along the top horizontal edge. FIG. 18*b* is an illustrative view showing a state where the binding position S of the printed paper is going to be changed to a new binding position S where the printed paper placed in portrait position is halved in the center into top and bottom parts. FIG. 18*c* is an illustrative view showing a state where the binding position S of the printed paper has been changed to the position where the printed paper is halved in the center into top and bottom parts.

In image forming apparatus 100, when the paper after printing is bound along the top horizontal edge, soft key 1321 is set with "Binding Position: Top", as shown in FIG. 18*a*.

When the binding position of the printed paper is changed to the saddle stitching position where the printed paper is halved in the center into top and bottom parts, soft key 1321 is touched as shown FIG. 18*a* so as to select an option "Binding Position: Center" from the options displayed under soft key 1321, "Binding Position: Left", "Binding Position: Right", "Binding Position: Top", "Binding Position: Right Top", "Binding Position: Left Top" and "Binding Position: Center", as shown in FIG. 18*b*.

When "Binding Position: Center" is selected, the preview on display panel 132 is changed as shown in FIG. 18*c* so that binding position S of the printed paper is displayed along the saddle stitching position where the printed paper is halved in the center into top and bottom parts while the direction of scrolling is switched so that the display screen can be scrolled from the bottom to the top.

At this time, the preview of the printed paper is rotated 90 degrees with the size of the printed paper kept as is while the document images to be recorded are reduced in size so that two pages of document images are allotted to the printed paper that is divided into top and bottom parts along the modified binding position S. Thus, the state of the document images being allotted is also presented in preview representation. Further, on display panel 132, the copy magnification information displayed at the right bottom of the screen is changed from 100% or the normal ratio to a reduction ratio of 71%.

When the binding position S is changed from the state in which "Binding Position: Center" is selected to the state in which "Binding Position: Top" is selected, the operation control is performed in reverse order to that described above.

As a result, the operativity of control on display panel 132 is switched from the state of feeling as if the user turns over pages of the printed paper bound at the top edge (the display screen is scrolled from the bottom to the top) to the state of feeling as if the user turns over pages bound at the saddle fold (the display screen is scrolled from the bottom to the top).

Further, when the binding position S is changed from the state in which "Binding Position: Center" is selected to the state in which "Binding Position: Top" is selected, the operation is performed in reverse order to that described above.

Here, when the position of saddle stitching is modified, it is necessary to add options for binding position S, such as "Binding Position: Center (Left-bound)" "Binding Position: Center (Right-bound)" "Binding Position: Center (Top-bound)", as the variations of "Binding Position: Center", to the pull-down display of soft key 1321 in FIG. 18*b*.

Next, description will be made on the case where the binding position S of the paper printed by image forming apparatus 100 is changed from the left vertical edge to the saddle stitching position in the center.

Figure 19A:
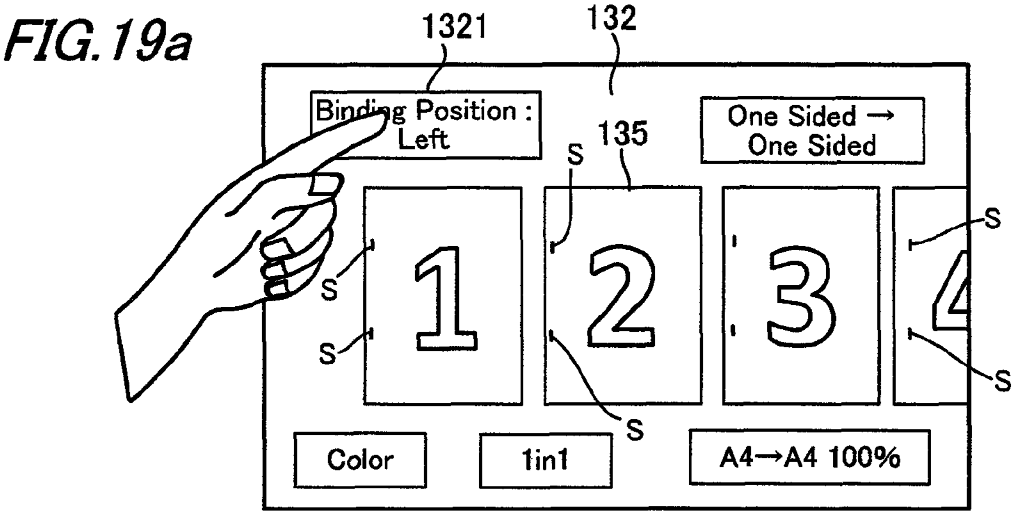
FIG. 19*a* is an illustrative view showing a state of printed paper in preview representation on the touch panel display, where the printed paper is set to be bound along the left vertical edge.
Figure 19B:
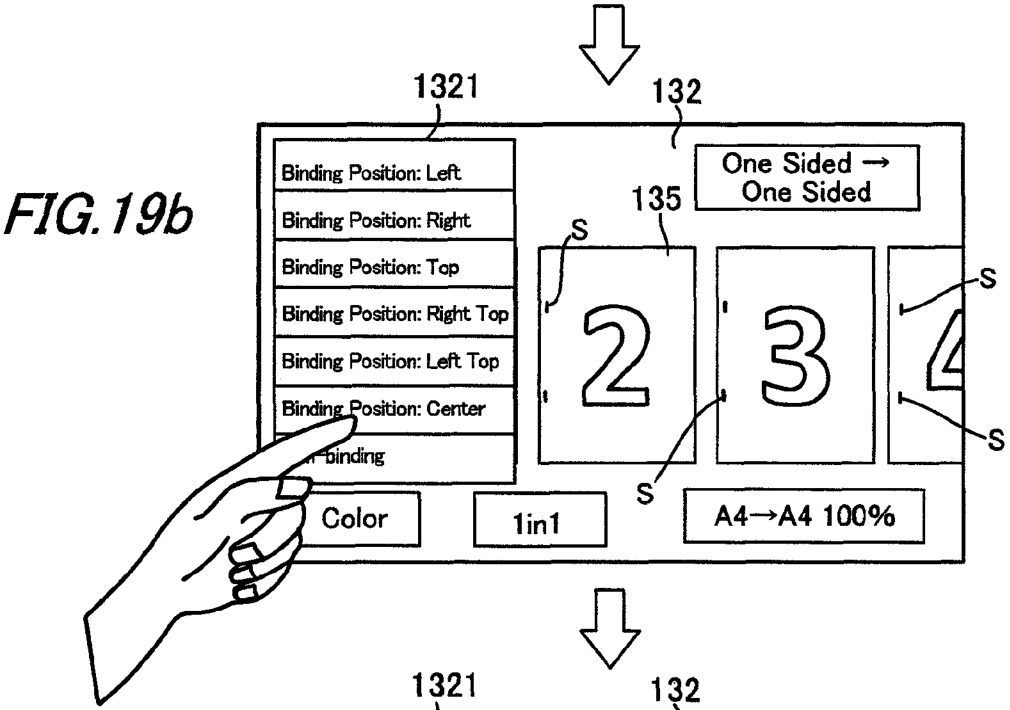
FIG. 19*b* is an illustrative view showing a state where the binding position of the printed paper is going to be changed to the position where the printed paper placed in landscape position is halved in the center into left and right parts.
Figure 19C:
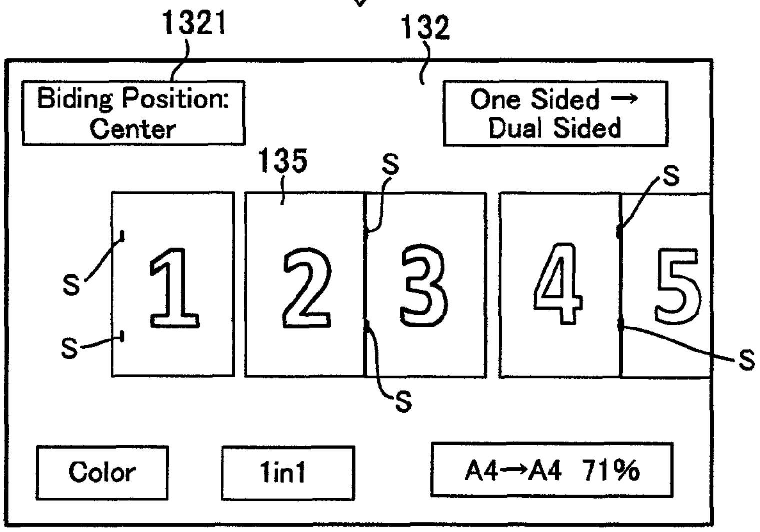
FIG. 19*c* is an illustrative view showing a state where the binding position of the printed paper has been changed to the position where the printed paper is halved in the center into left and right parts.

FIG. 19*a* is an illustrative view showing a state of printed paper in preview representation on the touch panel display of the present embodiment, where the printed paper is set to be bound along the left vertical edge. FIG. 19*b* is an illustrative view showing a state where the binding position S of the printed paper is going to be changed to a new binding position where the printed paper placed in landscape position is halved in the center into left and right parts. FIG. 19*c* is an illustrative view showing a state where the binding position S of the printed paper has been changed to the position where the printed paper is halved in the center into left and right parts.

In image forming apparatus 100, when the paper after printing is bound along the left vertical edge, soft key 1321 is set with "Binding Position: Left", as shown in FIG. 19*a*.

When the binding position S of the printed paper is changed to the saddle stitching position where the printed paper is halved in the center into left and right parts, soft key 1321 is touched as shown FIG. 19*a* so as to select an option "Binding Position: Center" from the options displayed under soft key 1321, "Binding Position: Left", "Binding Position: Right", "Binding Position: Top", "Binding Position: Right Top", "Binding Position: Left Top" and "Binding Position: Center", as shown in FIG. 19*b*.

When "Binding Position: Center" is selected, the preview on display panel 132 is changed as shown in FIG. 19*c* so that binding position S of the printed paper is displayed along the saddle stitching position where the printed paper is halved in the center into left and right parts while the direction of scrolling is switched so that the display screen can be scrolled from the right to the left.

At this time, the preview of the printed paper is rotated 90 degrees with the size of the printed paper kept as is while the document images to be recorded are reduced in size so that two pages of document images are allotted to the printed paper that is divided into left and right parts along the new binding position. Thus, the state of the document images being allotted is also presented in preview representation. Further, on display panel 132, the copy magnification information displayed at the right bottom of the screen is changed from 100% or the normal ratio to a reduction ratio of 71%.

When the binding position is changed from the state in which "Binding Position: Center" is selected to the state in which "Binding Position: Top" is selected, the operation is performed in reverse order to that described above.

Also, when the binding position on the printed paper is changed between "Binding Position: Right" and "Binding Position: Center", the preview display is switched in a similar manner to the above.

Next, description will be made on the case where the binding position S of the paper printed by image forming apparatus 100 is changed from the left vertical edge in the printed paper placed in landscape position to the saddle stitching position in the center in the printed paper placed in portrait position.

Figures 20A, 20B, 20C:
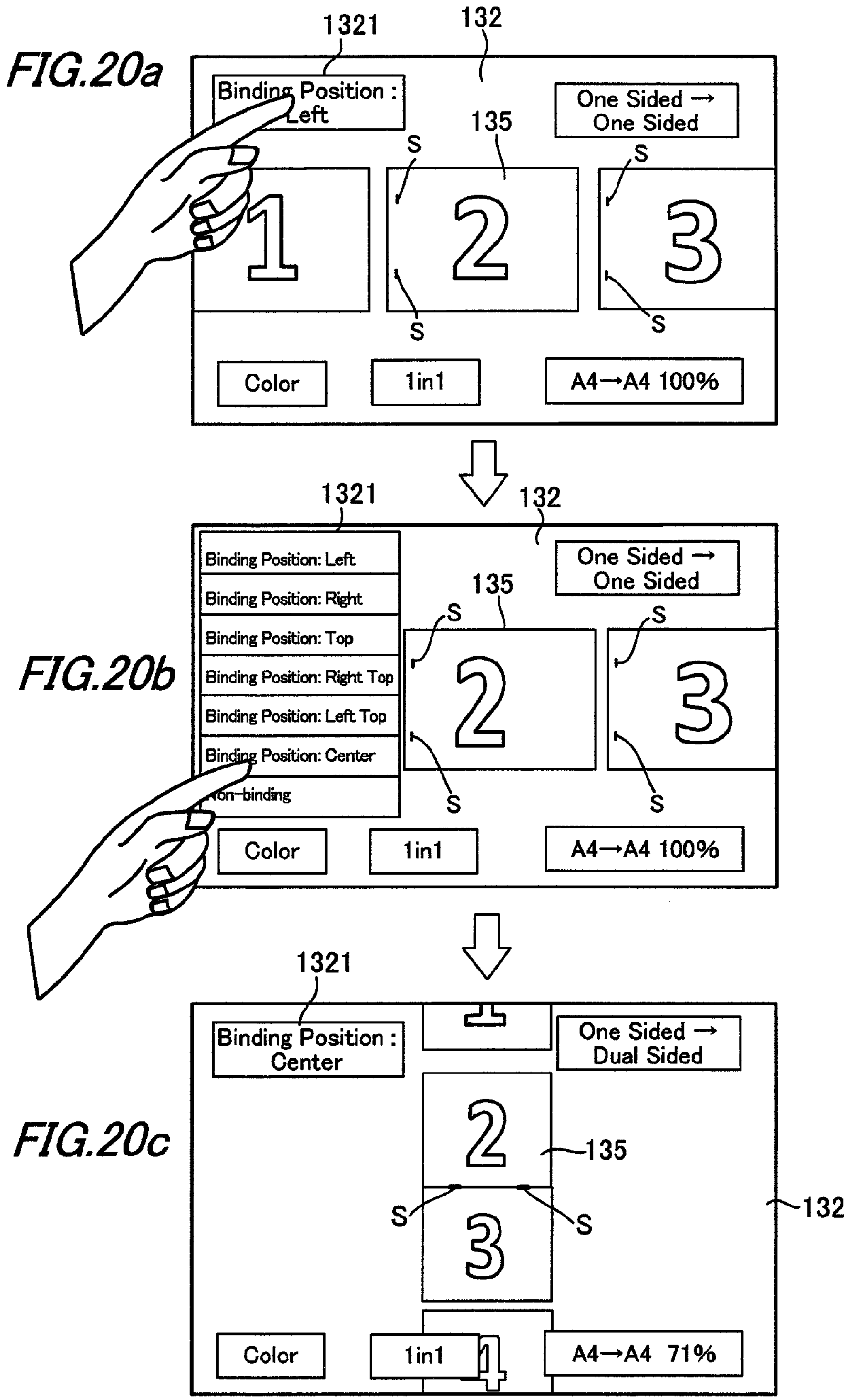
FIG. 20*a* is an illustrative view showing a state of printed paper in preview representation on the touch panel display, where the printed paper in landscape position is set to be bound along the left vertical edge.
FIG. 20*b* is an illustrative view showing a state where the binding position of the printed paper is going to be changed to the position where the printed paper placed in portrait position is halved in the center into top and bottom parts.
FIG. 20*c* is an illustrative view showing a state where the binding position of the printed paper has been changed to the position where the printed paper is halved in the center into top and bottom parts.

FIG. 20*a* is an illustrative view showing a state of printed paper in preview representation on the touch panel display of the present embodiment, where the printed paper placed in landscape position is set to be bound along the left vertical edge. FIG. 20*b* is an illustrative view showing a state where the binding position S of the printed paper is going to be changed to the position where the printed paper placed in portrait position is halved in the center into top and bottom parts. FIG. 20*c* is an illustrative view showing a state where the binding position S of the printed paper has been changed to the position where the printed paper is halved in the center into top and bottom parts.

In image forming apparatus 100, when the printed paper placed in landscape position after printing is bound along the left vertical edge, soft key 1321 is set with "Binding Position: Left", as shown in FIG. 20*a*.

When the binding position S of the printed paper is changed to the saddle stitching position where the printed paper is halved in the center into top and bottom parts, soft key 1321 is touched as shown FIG. 20*a* so as to select an option "Binding Position: Center" from the options displayed under soft key 1321, "Binding Position: Left", "Binding Position: Right", "Binding Position: Top", "Binding Position: Right Top", "Binding Position: Left Top" and "Binding Position: Center", as shown in FIG. 20*b*.

When "Binding Position: Center" is selected, the preview on display panel 132 is changed as shown in FIG. 20*c* so that binding position S of the printed paper is displayed along the saddle stitching position S where the printed paper is halved in the center into top and bottom parts while the direction of scrolling is switched so that the display screen can be scrolled from the bottom to the top.

At this time, the preview of the printed paper is rotated 90 degrees with the size of the printed paper kept as is while the document images to be recorded are reduced in size so that two pages of document images are allotted to the printed paper, above and below the binding position as a border. Thus, the state of the document images being allotted is also presented in preview representation. Further, on display panel 132, the copy magnification information displayed at the right bottom of the screen is changed from 100% or the normal ratio to a reduction ratio of 71%.

Here, as to the orientation of the printed paper, for example the preview display may be also provided such that two pages of the reduced images which each are rotated 90 degrees are allotted to the left and right sides, on the saddle binding position in the center of the A4 printed paper placed in landscape position, as the border. However, if the preview image is rotated 90 degrees, the preview of the reduced images are displayed so that the top-to-bottom direction of the document image is oriented in the horizontal direction. This will cause the user who is setting the documents to feel uneasy to recognize. This is why the preview of the printed paper is rotated 90 degrees while the preview of the document image is kept in the vertical position.

Next, description will be made on the case where the binding position S of the paper printed by image forming apparatus 100 is changed from the top horizontal edge in the printed paper placed in portrait position to the saddle stitching position where the printed paper placed in landscape position is halved in the center into the top and bottom parts.

Figure 21A:
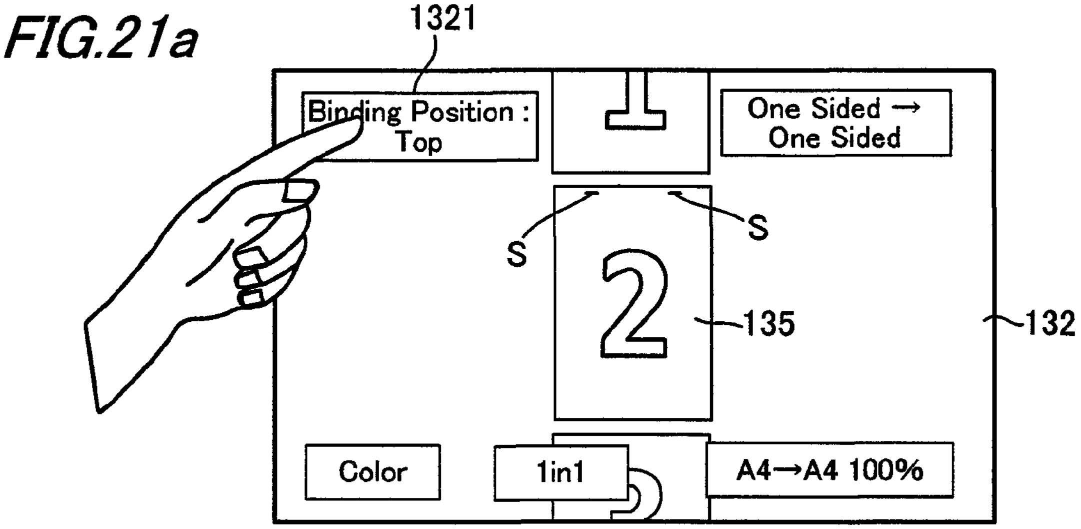
FIG. 21*a* is an illustrative view showing a state of printed paper in preview representation on the touch panel display, where the printed paper is placed in portrait position and set to be bound along the top horizontal edge.
Figure 21B:
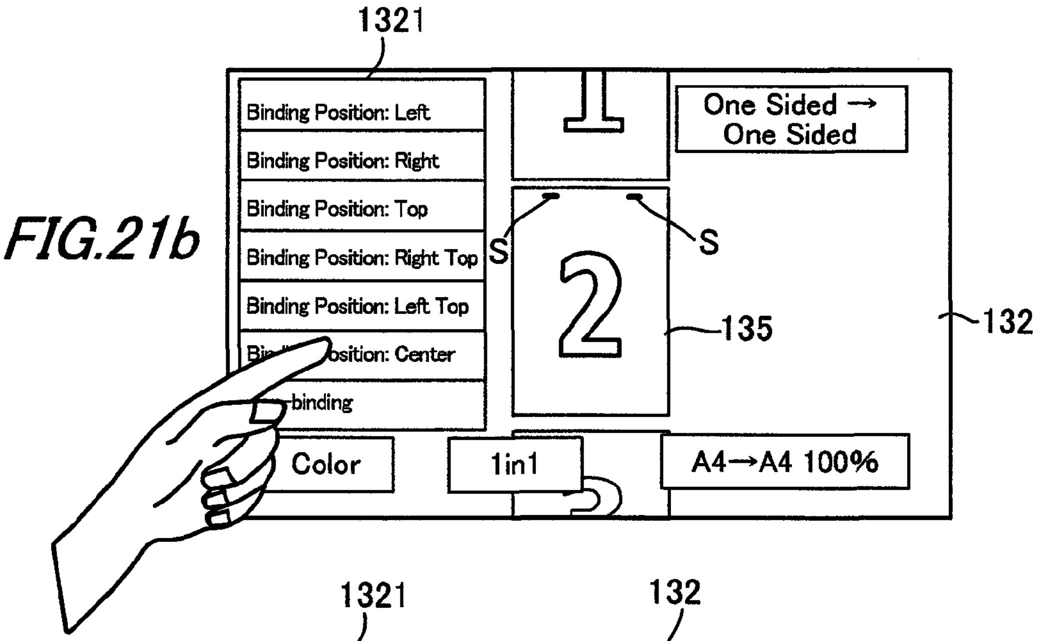
FIG. 21*b* is an illustrative view showing a state where the binding position of the printed paper is going to be changed to the position where the printed paper placed in landscape position is halved in the center into left and right parts.
Figure 21C:
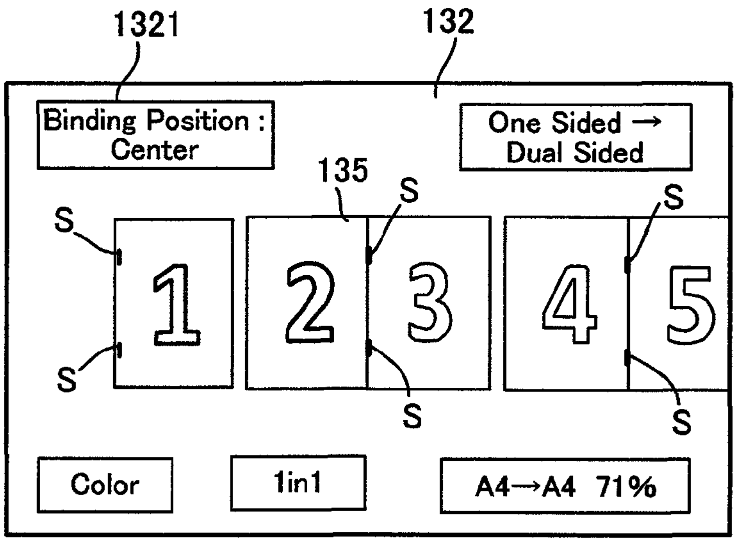
FIG. 21*c* is an illustrative view showing a state where the binding position of the printed paper has been changed to the position where the printed paper is halved in the center into left and right parts.

FIG. 21*a* is an illustrative view showing a state of printed paper in preview representation on the touch panel display of the present embodiment, where the printed paper is placed in portrait position and set to be bound along the top horizontal edge. FIG. 21*b* is an illustrative view showing a state where the binding position S of the printed paper is going to be changed to the position where the printed paper placed in landscape position is halved in the center into left and right parts. FIG. 21*c* is an illustrative view showing a state where the binding position S of the printed paper has been changed to the position where the printed paper is halved in the center into left and right parts.

In image forming apparatus 100, when the printed paper after printing is bound along the top horizontal edge, soft key 1321 is set with "Binding Position: Top", as shown in FIG. 21*a*.

When the binding position S of the printed paper is changed to the saddle stitching position where the printed paper is halved in the center into left and right parts, soft key 1321 is touched as shown FIG. 21*a* so as to select an option "Binding Position: Center" from the options displayed under soft key 1321, "Binding Position: Left", "Binding Position: Right", "Binding Position: Top", "Binding Position: Right Top", "Binding Position: Left Top" and "Binding Position: Center", as shown in FIG. 21*b*.

When "Binding Position: Center" is selected, the preview on display panel 132 is changed as shown in FIG. 21*c* so that binding position S of the printed paper is displayed along the saddle stitching position where the printed paper is halved in the center into left and right parts while the direction of scrolling is switched so that the display screen can be scrolled from the right to the left.

At this time, the preview of the printed paper is rotated 90 degrees with the size of the printed paper kept as is while the document images to be recorded are reduced in size so that two pages of document images are allotted to the printed paper that is divided into left and right parts along the new binding position. Thus, the state of the document images being allotted is also presented in preview representation. Further, on display panel 132, the copy magnification information displayed at the right bottom of the screen is changed from 100% or the normal ratio to a reduction ratio of 71%.

As a result, the operativity of control on display panel 132 is switched from the state of feeling as if the user turns over pages of the printed paper bound at the top edge (the display screen is scrolled from the bottom to the top) to the state of feeling as if the user turns over pages saddle-stitched at the center (the display screen is scrolled from the right to the left). Thus, the direction of scrolling of preview images is switched so that the display screen can be scrolled from vertical direction to horizontal direction.

In the above case, when the printed paper is saddle-stitched, either left-binding or right-binding can be selected. Therefore, it is possible to permit the user to select one of them.

The present embodiment illustrates a case where the printed paper is designated to be saddle-stitched at the left-binding so that reduced preview images are laid out in the order of 1, 2, 3, . . . from the left to the right on display panel 132.

When the state in which "Binding Position: Center" is selected is changed to the state in which "Binding Position: Top" is selected, the control is performed in reverse order to that described above.

As a result, the operativity of control on display panel 132 is switched from the state of feeling as if the user turns over pages of the printed paper saddle-stitched at the center (the display screen is scrolled from the right to the left) to the state of feeling as if the user turns over pages in bound at the top edge of the printed paper (the display screen is scrolled from the bottom to the top). Accordingly, the direction of scrolling the preview images is switched from the horizontal direction to the vertical direction of the display screen.

Though, in the above description of the embodiment the preview images displayed on display panel 132 are scrolled by the finger, the invention should not be limited to this. The pages may be moved by operating arrow keys or arrow buttons to give preview image display.

According to the present embodiment thus configured, in image forming apparatus 100, touch panel display 130 that functions as a display control means capable of displaying a preview of multiple pages of document images on display panel 132, is adapted to include: a binding position indicating controller 1315 that indicates binding position S in the printed paper; a binding process preview displaying controller 1316 that displays preview images of recording paper bound at the binding position S indicated by binding position indicating controller 1315; and a paper binding position-linked scrolling display switching controller 1317 that, when binding position S in printed paper is changed by binding position indicating controller 1315, switches the scroll display mode of the preview images of printed paper such that the direction of scrolling is suited to the bound recording paper. This configuration makes it possible to change the direction of scrolling the preview images in accordance with the setting of binding position S when the print preview images are displayed, and further enables the user to confirm the finished condition of the recorded matter to be actually produced, in a feeling as if the user is actually turning over the pages of the printed matter. As a result, the user is able to view the relationship of the position of each image-formed page in the finished printed matter and confirm the finished condition of the recorded matter every page in a feeling as if the user is turning over the page. In this way, the user is able to easily imagine the condition of the finished printed matter.

Further, according to the present embodiment, since copy magnification information is displayed on display panel 132 when the preview display of printed paper is switched, it is possible for the user to easily recognize reduction of document images from the indication of the reduction ratio with the reduced preview display when the document images are reduced and given in preview representation.

The above embodiment was described taking an example in which control unit 120 is applied to image forming apparatus 100 shown in FIG. 1. However, as long as it is an image forming apparatus in which document images are presented in preview representation on the display panel or the like before printing so as to enable confirmation of the printed condition, the invention can be developed to any other image forming apparatus and the like, not limited to the image forming apparatus and copier having the configuration described above.

Though in the above description, preview images 135 displayed on touch panel display 130 are scrolled, the preview images may be changed over in display screen unit (every multiple pages of preview images).

Further, though, in the above description, a flick control with the operator's finger is used as the technique to scroll preview images 135 displayed on touch panel display 130, keys for scrolling up, down, left and right may be displayed on touch panel display 130 so as to allow the operator to touch these keys to scroll.

Having described heretofore, the present invention is not limited to the above embodiment, various changes can be made within the scope of the appended claims. That is, it is apparent that various kinds of variations and modified examples will occur to those skilled in the art within the scope of the appended claims. That is, any embodied mode obtained by combination of technical means modified as appropriate without departing from the spirit and scope of the present invention should be included in the technical art of the present invention.

What is claimed is:

1. An image display control device comprising:

a control screen on which document images are presented in preview representation; and, a display controller that has a function of presenting plural pages of document images on the control screen in preview representation and a function of displaying the plural pages of document images presented in preview representation in a vertically or horizontally scrolling manner, characterized in that the display controller includes:

a binding position indicating function that, when recording paper with the document images recorded thereon are bound, indicates a binding position in the recording paper;

a binding process preview displaying function that displays preview images of the recording paper bound at the binding position indicated by the binding position indicating function;

a scrolling display switching function that switches the direction of scrolling the preview images displayed on the control screen, between the scrolling display mode in which the preview images are scrolled in the horizontal direction of the control screen and the scrolling display mode in which the preview images are scrolled in the vertical direction of the control screen, based on the binding position indicated by the binding position indicating function; and a recording paper selecting function that selects one side or both sides of the recording paper as recording surface for recording on the recording paper;

wherein the scrolling display switching function includes:

a function that, when one side of the recording paper is selected by the recording paper selecting function, sets the binding position of the recording paper which corresponds to the plural pages of document images to the edge of the recording paper, in the scrolling display mode of the preview images of the recording paper;

a function that, when both sides of the recording paper is selected by the recording paper selecting function, sets the binding position of the recording paper which corresponds to a first page of the plural pages of document images to the edge of the recording paper, and sets the binding position of the recording paper which corresponds to following pages to a position where the recording paper is halved in the center into parts corresponding to both sides of the recording paper, in the scrolling display mode of the preview images of the recording paper; and a function that displays preview images of the recording paper such that the recording paper which corresponds to the following pages are displayed adjacent to the opposite edge from the binding position of the recording paper which corresponds to the first page of document images, based on the binding position indicated by the binding position indicating function.

2. An image forming apparatus including an image display control device, characterized in that the image display control device is the image display control device according to claim 1.

* * * * *